(12) United States Patent
Hou et al.

(10) Patent No.: US 8,301,963 B2
(45) Date of Patent: Oct. 30, 2012

(54) LOW-DENSITY PARITY-CHECK CODE BASED ERROR CORRECTION FOR MEMORY DEVICE

(75) Inventors: Ping Hou, Fremont, CA (US); Eugen Gershon, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 1280 days.

(21) Appl. No.: 11/877,497

(22) Filed: Oct. 23, 2007

(65) Prior Publication Data

US 2009/0106626 A1 Apr. 23, 2009

(51) Int. Cl.
*H03M 13/00* (2006.01)
*G11C 29/00* (2006.01)

(52) U.S. Cl. ......................... 714/755; 714/758; 714/763
(58) Field of Classification Search ........................ None
See application file for complete search history.

(56) References Cited

U.S. PATENT DOCUMENTS

| | | | | |
|---|---|---|---|---|
| 7,831,883 | B2 * | 11/2010 | Tong et al. ..................... | 714/752 |
| 2005/0050435 | A1 * | 3/2005 | Kyung et al. .................. | 714/800 |
| 2006/0195754 | A1 * | 8/2006 | Shen et al. ..................... | 714/752 |
| 2007/0171714 | A1 * | 7/2007 | Wu et al. .................. | 365/185.09 |
| 2008/0034272 | A1 * | 2/2008 | Wu et al. ........................ | 714/763 |

OTHER PUBLICATIONS

Fossorier et al., May 1999 "Reduced Complexity Iterative Decoding of Low-Density Parity Check Codes Based on Belief Propagation" (1999) IEEE Transactions of communications, vol. 47, No. 5, pp. 673-680.*

Gallager. "Low-Density Parity-Check Codes" (1968) IRE Trans. Information Theory, vol. IT-8, pp. 21-28.

Song, et al. "Reduced-Complexity Decoding of Q-ary LDPC Codes for Magnetics Recording" (2003) IEEE Transaction on Magnetics, vol. 39, No. 2, pp. 1081-1087.

MacKay. "Good Error-Correcting Codes Based on Very Sparse Matrices" (1999) IEEE Transactions on Information Theory, vol. 45, No. 2, pp. 399-341.

Davey, et al. "Low Density Parity Check Codes Over GF(q)" (1998) IEEE Communication Letters vol. 2, No. 6, pp. 165-167.

MacKay, et al. "Near Shannon Limit Performance of Low Density Parity Check Codes" (1996) Electron Letters, vol. 32, No. 8, pp. 1645-1645.

Yang, et al. "Design of Efficiently Encodable Moderate-Length High-rate Irregular LDPC Codes" (2004) IEE Transactions on Communications vol. 52, No. 4.

Richardson, et al. "The Capacity of Low-Density Parity-Check Codes Under Message-Passing Decoding" (2001) IEEE Transactions on Information Theory vol. 47, No. 2, pp. 599-618.

Richardson, et al. "Design of Capacity-Approaching Irregular Low-Density Parity-Check Codes" (2001) IEEE Transactions on Information Theory vol. 47, No. 2, pp. 619-637.

* cited by examiner

*Primary Examiner* — John Trimmings
*Assistant Examiner* — Daniel McMahon
(74) *Attorney, Agent, or Firm* — Turocy & Watson, LLP

(57) ABSTRACT

An accumulative repeat encoder facilitates encoding data written to memory, such that parity data is generated in accordance with a low-density parity-check (LDPC) code. The original data and associated parity data is stored in memory. During a read operation, a decoder component utilizes the parity data based on the LDPC code to facilitate decoding the data being read from memory. The decoder component is iterative and provides one or more decoding results based on probabilities that symbols or bits comprising the data have correct values. The decoder component analyzes a decoding result and references a parity-check matrix structured in accordance with the LDPC code to determine the accuracy of the decoding result. If the decoding result attains a desired accuracy, the decoding result is determined to represent the original data and is provided as an output.

20 Claims, 13 Drawing Sheets

LOW-DENSITY PARITY-CHECK CODE BASED ERROR CORRECTION FOR MEMORY DEVICE

TECHNICAL FIELD

The present invention relates generally to memory systems and in particular to systems and methods for error correction of data in a memory device.

BACKGROUND

Memory devices can be used to maintain and store data in electronic devices. In particular, flash memory is a type of electronic memory media that can be rewritten, and can retain content without consumption of power. Flash memory has become popular, at least in part, because it combines the advantages of the high density and low cost of electrically programmable read only memory (EPROM) with the electrical erasability of electrically erasable programmable read only memory (EEPROM). Flash memory is used in many portable electronic products, such as cell phones, portable computers, voice recorders, thumbnail drives and the like, as well as in many larger electronic systems, such as cars, planes, industrial control systems, etc. The fact that flash memory can be rewritten as well as its retention of data without a power source, small size, and light weight have all combined to make flash memory devices useful and popular means for transporting and maintaining data.

As flash memory devices have continued to evolve, the density of data stored in such devices has increased. With the increasing density of data stored in flash devices, read errors can be an issue due in part to the close proximity of read threshold levels. Further, as erase cycles increase, read errors may occur more frequently. It is desirable to maintain the accuracy and reliability of flash devices. An error correction code (ECC) can be implemented to facilitate maintaining the accuracy and reliability of memory devices, such as flash memory. However, in determining the type of error correction to implement as well as how to implement such error correction, it is desirable to consider certain factors, such as channel behavior, ECC implementation complexity (e.g., gate count, power consumption, etc.), ECC correction capability, and latency of decoding, with regard to respective ECCs, for example.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that facilitate error correction of data stored in a memory, such as a flash memory device (e.g., multi-level, multi-bit flash memory device, single-bit flash memory device). In accordance with one aspect of the disclosed subject matter, an accumulative repeat encoder component (AREC) can be utilized to facilitate encoding data being written to the memory as the AREC can generate parity data (e.g., redundant information) based in part on a low-density parity-check (LDPC) code that can be associated with the data. The parity data can be utilized to facilitate error correction of the data when it is read from the memory. The AREC can retrieve information associated with a parity-check matrix that is structured in accordance with the LDPC code, and can also include an integrating component that can be based in part on another matrix associated with the LDPC code, to facilitate encoding the data being written to memory and generating the parity data in accordance with the LDPC code.

In accordance with another aspect of the disclosed subject matter, a decoder component can be employed to facilitate decoding data read from the memory. The decoder component can receive the data originally written to memory as well as the associated parity data, which the decoder component can utilize to accurately determine the original data written to the memory. In accordance with one embodiment of the disclosed subject matter, the decoder component can be an iterative decoder that can perform one or more iterations, as desired, to yield a decoding result that meets a predetermined threshold level of accuracy with regard to the error correction of the data.

For each iteration, the decoder component can perform certain probability calculations associated with determining the probability of a symbol or bit in a sequence of data has a correct value, that is, the value of the symbol or bit being decoded is the same value as the corresponding symbol or bit of the original data written to the memory. The decoded result for a piece of data (e.g. symbol sequence, bit sequence) can be analyzed to determine whether the decoding result meets predefined accuracy criteria (e.g., satisfies predefined check equations and/or meets predefined accuracy threshold level). In accordance with an aspect, matrix information associated with the LDPC code can be utilized to facilitate determining whether the decoding result of the current iteration meets the predefined accuracy criteria.

If the decoder component determines that the decoding result meets the predefined accuracy criteria, the data (e.g., decoded data) can be provided as an output, for example, to a host processor or cryptographic component, for example. If it is determined that the decoding result does not meet the predefined accuracy criteria, one or more subsequent iterations can be performed, up to a predetermined maximum number of iterations, until a desired decoding result is obtained or until the maximum number of iterations have been performed. If the maximum number of iterations are performed without a decoding result attaining the desired accuracy threshold level with regard to the decoding result accurately representing the data originally written to the memory, the decoder component can provide an error message (e.g., side information) indicating the read data was not accurately decoded, provide the decoding result from the last iteration as an output even though the result is not optimal, and/or provided the data and/or decoding result from the last iteration to another component for further processing (e.g., error correction, data reconstruction).

In accordance with yet another embodiment of the disclosed subject matter, the decoder component can be structured so that multiplication and division computations associated with the decoding of the data can be translated into the log domain, so that the multiplication and division computations can be correspondingly changed into addition and subtraction computations, which can thereby reduce the workload for computation, the gate count for hardware requirements, and/or the amount of time required to perform the computations associated with decoding data.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
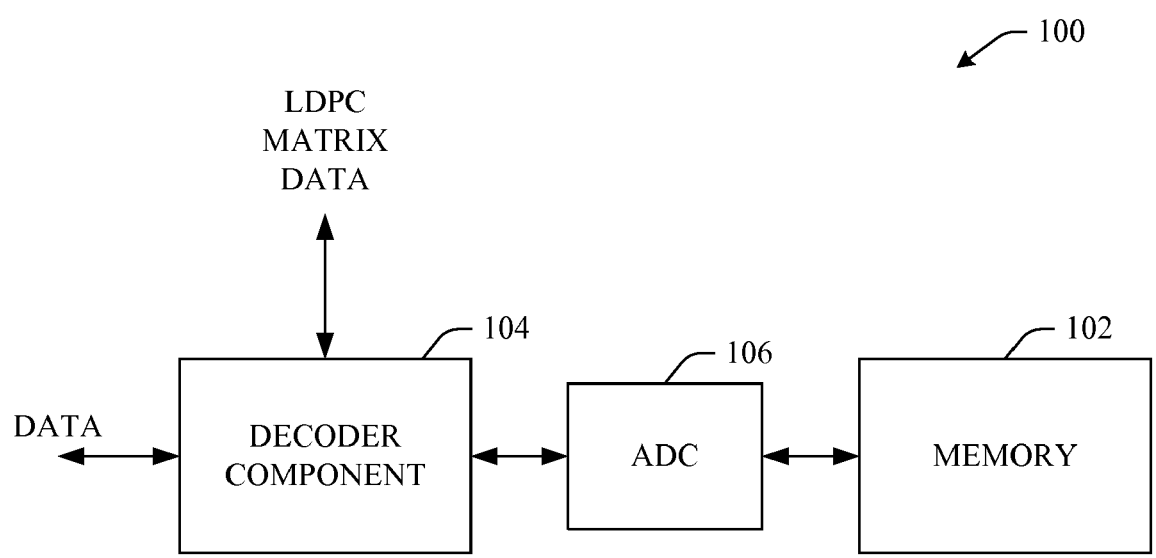
FIG. 1 illustrates a block diagram of a system that facilitates error correction of data read from a memory in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Flash memory devices have become increasingly popular in part due to the capability of such devices to be rewritten and to retain data without a power source as well as due to their small size and light weight. Such features can make flash memory devices desirable for use in many portable electronic products (e.g., cell phones, portable computers, voice recorders). As flash memory devices have continued to evolve, the density of data stored in such devices has increased. With the increasing density of data stored in flash devices, read errors can be an issue due in part to the close proximity of read threshold levels. Further, as erase cycles increase, read errors may occur more frequently. Various types of error correction code (ECC) can be employed to facilitate error correction of data read from memory in order to maintain the accuracy and reliability of flash devices. However, in determining the type of error correction to implement as well as how to implement such error correction, it is desirable to consider certain factors, such as media (e.g. cell) behavior, ECC implementation complexity (e.g., gate count, power consumption, etc.), ECC correction capability, and latency of decoding, with regard to respective ECCs, for example.

Systems and/or methods are presented that can facilitate error correction of data read from memory based in part on a low-density-parity-check (LDPC) code. A decoder component can receive data read from a memory (e.g. flash memory) and can facilitate iteratively decoding (e.g., error correcting) the data based in part on the LDPC code to obtain a final decoding result that can represent the original data written to the memory. The decoder component can employ maximum a posterior (MAP)-based decoding to facilitate decoding of data in a computationally efficient manner. An accumulative repeat encoder component can facilitate generating parity data based in part on input data from a user in an efficient manner, where the original data and associated parity data can be stored in the memory. In one aspect, the accumulative repeat encoder component can generate parity data in accordance with the LDPC code. LDPC-based encoding and decoding of data associated with flash memory devices, as employed in the subject innovation, can result in a reduction in the amount of redundancy (e.g., parity data) being utilized to facilitate error correction of data, a reduction in power consumption of the device, a reduced gate count, and a smaller latency period, as compared to convention error correction systems/methods.

Turning to FIG. 1, illustrated is a system 100 that facilitates access of data to or from a memory in accordance with an embodiment of the disclosed subject matter. System 100 can include a memory 102 that can be utilized to store data via write operations and provide data via read operations, for example. In one aspect, memory 102 can include non-volatile memory, such as, for example, flash memory, read only memory (ROM), programmable ROM (PROM), erasable programmable read only memory (EPROM), electronically erasable programmable read only memory (EEPROM), and the like.

In accordance with one embodiment of the disclosed subject matter, the memory 102 can be a flash memory device that can include a plurality of multi-level, multi-bit memory cells (not shown), where each bit, or a combination of multiple bits (which can be referred to as a symbol), of a memory cell can be programmed to multiple target values of levels. For example, four distinct levels (e.g., L1, L2, L3, and L4) corresponding to varying amounts of charge can represent two data bits, where L1 can be the lowest or unprogrammed state correspondingly having the lowest amount of charge stored, and L4 can be the highest state correspondingly having the highest amount of charge stored. The memory cell can maintain two sides with two bits on each side, where each two bits can be represented by any of four possible levels of charge, and thus can be programmed for sixteen distinct states or bit pair combinations.

System 100 can further include a decoder component 104 that can facilitate decoding (e.g., error correcting) data read from memory 102, so that such decoded data can be a representation of the data originally written to the memory 102 and can be provided, for example, to a host processor (not shown) or other component (e.g., cryptographic component (not shown)) for further processing. During a read operation, the data (e.g., information) associated with the read operation and associated parity data, which can be used to facilitate error correction of the data, can be read from one or more memory locations (e.g., memory cells) (not shown) in memory 102. The read data can be in the form of analog information (e.g., current level(s)) that can represent and/or be associated with the original data as well as analog information that can represent and/or be associated with the parity data (e.g., redundant information). Since the read data and parity data is in analog form, the read data and parity data can be provided to an analog-to-digital converter 106 (hereinafter also referred to as "ADC 106") that can convert or translate the read data and parity data into digital information (e.g., binary sequences) that can correspond to the analog information read or detected from the desired memory location(s) in the memory 102. The read data and parity data, now converted to data in a digital form to be utilized in the digital domain, can then be provided to the decoder component 104 to be decoded. In accordance with one embodiment of the disclosed subject matter, the decoder component 104 can be an iterative decoder that can employ an LDPC code and maximum a posterior (MAP)-based decoding to facilitate decoding data read from the memory 102. Given a memory 102 that can include memory cells that each have multiple bits, there can be a finite field (e.g., Galois Field (GF)), GF(q), where q can be a number corresponding to the number of bits of a memory cell. For example, given a memory 102 that is a quad-bit flash memory, GF(q)=GF(4), where there can be four states, 0, 1, 2, and 3 on either side of a cell. In general, a finite field GF($q^m$) can be in consideration where q can be a prime number and m can be an integer. As an example, given q=3 and m=2, GF(9) can be generated, which can have storage of 3 levels within a cell and each cell can have two aforementioned 3-level signals; in comparison, given q=2 and m=3, GF(8) can be generated, which correspondingly can have storage of 2 levels and each cell can have 3 such 2-level signals. Upon rendering a final decoding result, the decoder component 104 can generate an output (e.g., binary sequences, symbol sequences) that can represent the original data that was written to the memory 102.

As there can be more than two storage levels in a multi-bit, multi-level memory, the term "symbol" can be used instead of "bit", as each symbol can have multiple-bit information. For instance, where the memory cell has four levels, Symbol 2 can represent two information bits 10, and Symbol 3 can represent two information bits 11.

In accordance with one aspect, the decoder component 104 can perform multiple iterations, as desired, up to a predetermined maximum number of iterations, with regard to the received data in order to decode the received data. The decoder component 104 can receive the data and parity data read from the memory 102, where the data and parity data can be converted to digital form (e.g., binary sequences) to facilitate decoding of the data in the digital domain. The decoder component 104 also can receive information from one or more matrices, including matrix H which can be comprised of matrices $H_1$ and $H_2$, where $H=[H_1 \; H_2]$, that can be defined by the LDPC code. In accordance with an aspect of the disclosed subject matter, the structure of matrix H can be represented by a mesh network that can be realized by hardware (or digital circuit). Based in part on the user data, parity data, and information of matrix H, the decoder component 104 can iteratively decode the user data and can make a determination as to whether the decoding result is an accurate result.

The matrices can be employed to facilitate encoding and decoding of data, and can be structured in accordance with the LDPC code. The matrix H can be an mm×nn matrix and can be comprised of two matrices $H_1$ and $H_2$, where $H_1$ can facilitate encoding of data to generate parity data, and matrix $H_2$ can be associated with an integrator (not shown) that can facilitate generating parity data in accordance with the LDPC code. In one aspect, matrix $H_1$ can have no weight-2 columns, no 4-cycle loop, and can be generated by a computer, for example. Since $H_1$ can have no weight-2 columns, $H_1$ typically will have at least three non-zero integer values per column. For example, given a GF(q), the non-zero integer values can range from 1 to q-1, such that for GF(2), the non-zero integer values each can have a value of 1, and for GF(4), the non-zero integer values each can have a value of 1, 2, or 3 for a 4-level coding.

Matrix $H_2$ can be a full-rank mm×mm matrix where mm=nn−kk, where kk can be the bit length of the data for single-level coding or the symbol length of the data for multi-level coding, nn can be a desired number greater than kk, and mm can be the amount of redundancy (e.g., parity-check information) which can be used to facilitate error correction of the data. Furthermore, in consideration of matrix $H_2$, in each column of matrix $H_1$, there can be a constraint that there cannot be non-zero elements in a row. This constraint can facilitate ensuring that matrix H is 4-cycle-loop free. Matrix $H_2$ can have a transfer function of 1/(1+D), with the matrix of $H_2$ having a specific format illustrated as follows:

$$\begin{bmatrix} 1 & & & & & & & \\ 1 & 1 & & & & & & \\ & 1 & 1 & & & & & \\ & & & \ldots & \ldots & \ldots & & \\ & & & & & 1 & 1 & \\ & & & & & & 1 & 1 \\ & & & & & & & 1 & 1 \end{bmatrix}$$

Such a structure of parity-check matrix H can ensure a recursive solution of generating parity-check bits. For example, the parity-check bits can be determined recursively as follows: the first check equation, associated with the first row of matrix $H_2$, can relate to only the first parity-check bit; the second check equation, associated with the second row of matrix $H_2$, can relate to the first two parity-check bits; the third check equation, associated with the third row of matrix $H_2$, can relate to the next two parity-check bits; and so on for the entire $H_2$ matrix. The matrix $H_2$ can be structured such that it has no 4-cycle loop which, together with matrix $H_1$, can ensure that matrix H does not have any 4-cycle loop.

In accordance with the LDPC code and associated matrices, with a given sequence of symbols, Y, from the information read from the memory 102 during a read operation, a goal of the decoding of the data can be to determine the original symbol sequence X that was written to the memory 102, such that H×X=0, where symbol sequence X can be the data and associated parity data written to memory wherein the parity data can be generated by an encoder (e.g., accumulative repeat encoder component) in accordance with the matrix H that can be based in part on the LDPC code.

It is to be appreciated that multiplication and addition operations between symbol-based matrix H and symbol-based matrix X can be different from traditional operations. A field that has a finite number of elements (e.g., four elements) is called a finite field, in contrast to a field of integer, which can have an infinite number of elements. The multiplication and addition operations as well as inverse operations can be designed or specified over a finite field. Thus, for example, given a memory cell that has four levels, a sum or product of any two of the four levels (e.g. 0, 1, 2, 3) can be an element over the field having elements 0, 1, 2, and 3.

During each iteration, given matrix H, which can be an mm×nn matrix employed for encoding and decoding data, the decoder component 104 can calculate the probability $R_{mn}(a)$ of the $m^{th}$ check being satisfied, when symbol n of the codeword is considered to be in state a over a finite field GF(q) (e.g., a∈GF(q)) and the other symbols can have a separable distribution given by the probabilities $\{Q_{mn}(b): n' \in N(m)\backslash n, b \in GF(q)\}$ where N(m) represents all the columns having non-zero elements on the $m^{th}$ row and N(m)\n represents all members within N(m) excluding the element on the $n^{th}$ column. That is, $R_{mn}(a)$ can be the probability that, corresponding to matrix H, at location of row m and column n (that is, H(m,n), equivalently, symbol n for the $m^{th}$ check), the element is chosen as value a. For instance, $R_{35}(2)$ can mean the probability when the element at H(3,5) can be assumed to be equal to 2. In accordance with one aspect, the decoder component 104 can calculate the probability $R_{mn}(a)$ utilizing the following equation:

$$R_{mn}(a) = \sum_{X:x_n=a} P(z_m = 0 | X) \prod_{k \in N(m)\backslash n} Q_{mk}(x_k)$$

More particularly, the above calculation can imply that the quantity $R_{mn}(a)$ can represent the Probability Density Function (PDF) of the $n^{th}$ symbol being in any of the q number of legitimate states for each individual PDF for the rest of the symbols with the $m^{th}$ check which is satisfied.

The decoder component 104 can also facilitate determining $Q^{mn}(a)$, which can denote the probability of the $n^{th}$ symbol being in the state a ∈GF(q). That is, $Q_{mn}(a)$ can be the probability of elements within matrix H on the $m^{th}$ check (e.g., along row m) and all the other non-zero elements on column n to be element a. In accordance with an aspect, the decoder component 104 can calculate $Q_{mn}(a)$ utilizing the following equation:

$$Q_{mn}(a) = \alpha_{mn} f_n(a) \prod_{k \in M(n)\backslash m} R_{kn}(a)$$

More explicitly, $Q_{mn}(a)$ can be determined by multiplying the intrinsic probability $f_n(a)$ by the product $R_{kn}(a)$, where $f_n(a)$ can be the intrinsic probability for Symbol n under the assumption that Symbol n should be a, which can be directly from the sample value without iterative updating. Here, M(i) and N(i) can represent a set of row and column indices of the non-zero entries in the $i^{th}$ column and row, respectively. Such product can result in $Q_{mn}(a)$ being more accurate as such product can bring in certain innovation probability signals from other symbols. For the first iteration, an initial value for $Q_{mn}(a)$ can be $Q_{mn}(a)=f_n(a)$.

The decoder component 104 can further compute an a posteriori probability $P_n(a)$ that can be the probability when symbol n can be decoded as a. For example, $P_n(a)$ can be computed utilizing the following equation:

$$P_n(a) = \alpha_n f_n(a) \prod_{k \in M(n)} R_{kn}(a)$$

In the above equation, $f_n(a)$ can be the a priori probability and the term within the product can be obtained by multiple iterations. $P_n(a)$ can be utilized to implement hard decoding, that is, for each given n, locate the largest $P_n(a)$ over a, and the corresponding value of a at that point can be the decoding result for that iteration.

The quantity $\alpha_{mn}$ and $\alpha_n$ in the above equations can be normalization factors which can be chosen to make $Q_{mn}(a)$ and $P_n(a)$ valid PDFs, namely, $$\sum_{a \in GF(q)} Q_{mn}(a) = 1 \text{ and } \sum_{a \in GF(q)} P_n(a) = 1$$

After the calculations of $R_{mn}(a)$, $Q_{mn}(a)$, and $P_n(a)$ have been performed, the decoder component 104 can utilize the calculation result of $P_n(a)$ to make a decision as to whether the decoding result has satisfied pre-determined constraints and conditions for termination of the iterative decoding (e.g. satisfied predefined accuracy criteria). For the Symbol sequence Y read from memory 102, the above calculations can yield a decoding result that can be a symbol sequence X'(r), where r can be the iteration number for the current iteration. To facilitate determining whether the decoding result has achieved the desired accuracy, the decoder component 104 can reference and/or receive information associated with the parity-check matrix H. The decoder component 104 can perform matrix multiplication of the matrix H and symbol vector X'(r), which can be the matrix representation of the decoded symbol sequence X'(r), for the current iteration, associated with the data and parity data read from the memory 102, and then can analyze and/or compare that multiplication result to determine whether the decoding result is correct. That is, the decoder component 104 can calculate H×X'(r) (e.g., by matrix multiplication over a finite field) to determine whether the decoding result, X'(r), satisfies the predefined constraints (e.g., predefined accuracy criteria), that is, to determine whether H×X'(r)=0, such as follows:

$$H \times X'(r) = [H_1 \ H_2] \begin{bmatrix} x'_1(r) \\ x'_2(r) \end{bmatrix} = H_1 x'_1(r) \oplus H_2 x'_2(r) = 0$$

where $x'_1(r)$ and $x'_2(r)$ can be related to the redundant information generated during encoding of the data when the data was being written to the memory 102 but after $r^{th}$ iterative decoding. That is, when Symbol sequence X is encoded when being written to the memory 102, the encoding can be per formed such that it can correspond to the constraints that can be defined by the following equation:

$$H \times X = [\, H_1 \quad H_2 \,] \begin{bmatrix} x_1 \\ x_2 \end{bmatrix} = H_1 x_1 \oplus H_2 x_2 = 0$$

It is to be understood that symbols can pass certain probability information between the given symbol sequence through a check constraint. Matrix H can provide a constraint of the symbol sequence. Each symbol within the sequence can correspond to a column of matrix H. Since any row or column of matrix H can be non-zero, probability information from column i (corresponding to symbol i) can be passed into column j (corresponding to symbol j) through a shared row. For example, row k can connect two columns, where the elements at the interconnection of k and i, and k and j can be non-zero. Similarly, each row of matrix H can correspond to a check point, and elements within each row, where multiplying the corresponding symbols in the sequence can establish a constraint (e.g., check). The number of rows can be equal to the number of constraints. Information from each check point can propagate to another check point through the interconnection on the same column and/or symbol. Such information can contain and/or can facilitate determining the probability of the check being satisfied.

With regard to the decoding result, X'(r), if H×X'(r)=0, the decoder component 104 can determine that the decoding result meets the predefined accuracy criteria, and thus X'(r) can be assumed to be equal to X, and the decoder component 104 can generate the decoding result as an output. If the H×X'(r)≠0, the decoder component 104 can determine that the decoding result does not satisfy the predefined accuracy criteria, such as, for example, as it can be determined that the decoding result violates at least one check equation, and additional iterations, up to a predetermined maximum number of iterations, can be performed to achieve the desired decoding result, where the iterations can stop and the decoding result can be provided as an output when the desired accuracy threshold is achieved. If the maximum number of iterations is performed and the decoded result has not met the predefined accuracy criteria, the decoder component 104 can provided the decoded result of the final iteration as an output.

The calculations associated with the decoding of data by decoder component 104 can present a heavy computation load, since both multiplication and division operations with digital and digitized signals can take a significant period of time and high resolution can be desirable. To improve the computation without impacting performance, the decoder component 104 can translate the computations associated with decoding of data into the log domain, and hence, the multiplication and division calculations can be correspondingly changed into addition and subtraction calculations. For example, MAP-based decoding can be computed in the log domain to accelerate decoding of the data and reduce the gate count to implement the decoder component 104. With a Fast Fourier Transform (FFT) technique, the computation workload can thereby be reduced considerably. It should be noted that original addition and subtraction calculations in the conventional domain can have specific treatment in the log domain, so that such calculations can be performed in an appropriate manner without degrading calculation resolution. Overall, translating the calculations into the log domain can substantially reduce the hardware requirements for implementation and computation time requirements.

MAP-based decoding can be more desirable than other forms of decoding, such as Maximum Likelihood (ML) decoding. ML decoding is based on an assumption that all symbols are equally probable or based on some other pre-set probabilities, which may not be true in practice, as for each specific symbol sequence, some symbols can be used more frequently than other symbols, and, thus, even if statistically all symbols can be equally probable, they might not be for a particular symbol sequence, which has to satisfy some encoding constraints at during encoding by the encoder (e.g., accumulative repeat encoder component, as described infra). Such an equal-likely assumption can degrade decoding performance. Further, ML decoding does not consider pre-determined constraints (e.g. H×X=0), and as a result, an ML-based decoding result can ignore or violate such pre-determined constraints can thereby be more likely to be incorrect or less accurate than a decoded result using MAP-based decoding.

Simulations of a decoder employing various LDPC codes were performed. A number of regular and irregular LDPC codes on different ratios were generated by computer search. Simulation was performed with decoding algorithms in both the conventional domain and log domain. The results show that the LDPC code can outperform the Reed-Solomon (RS) code and the Bose-Chaudhuri-Hocquenghem (BCH) code at the same or similar coding rate. Typically, with the same amount of redundancy added to data for each type of code, the BER for the LDPC ECC can be as low as less than 1% of that of the RS code. Consequently, the performance from the LDPC code can be attractive for non-volatile memory devices, such as flash memory devices (e.g., multi-bit flash memory).

Figure 2:
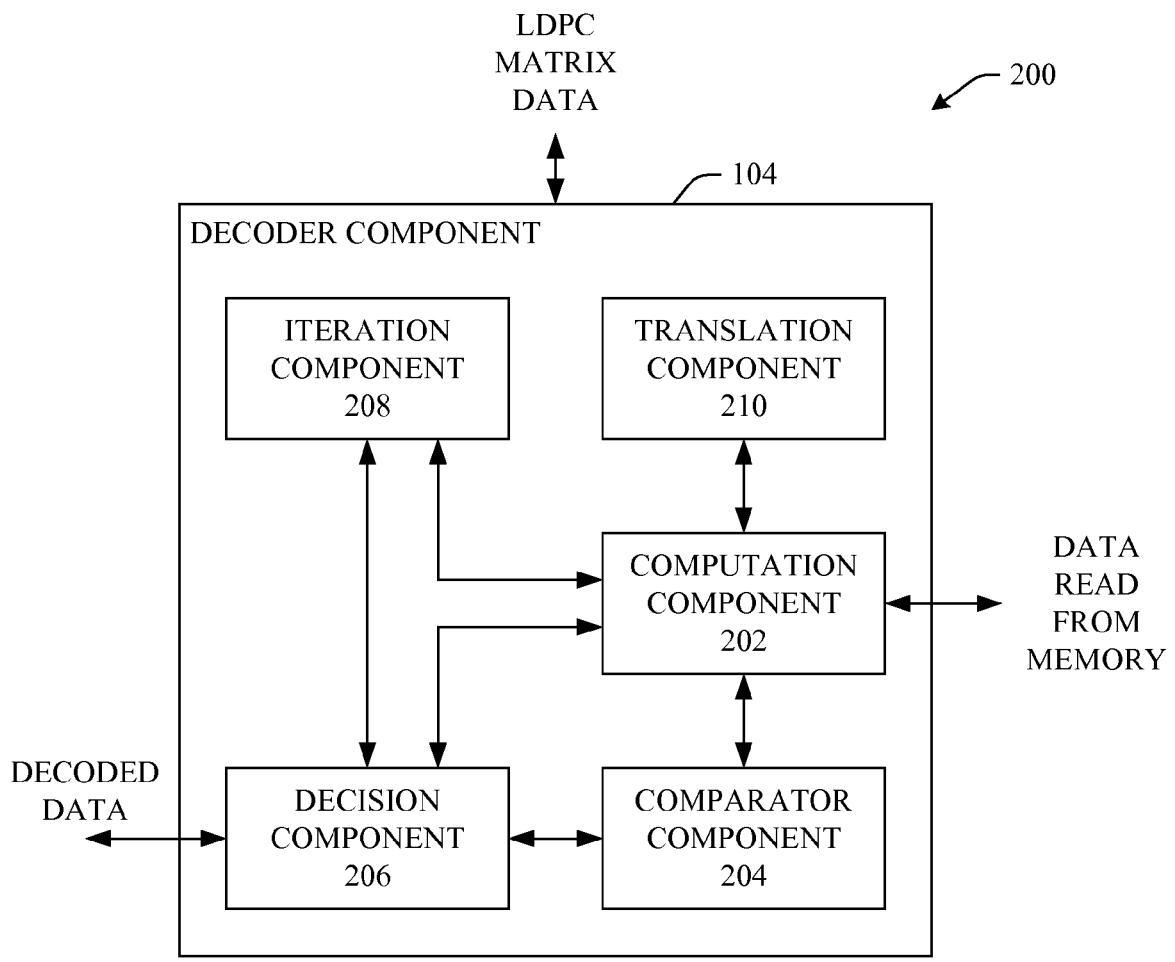
FIG. 2 illustrates a block diagram of another system that facilitates error correction of data in accordance with an aspect of the subject matter disclosed herein.

Referring to FIG. 2, illustrated is a block diagram of a system 200 that can facilitate error correction of data in accordance with an aspect of the disclosed subject matter. System 200 can include a decoder component 104 that can receive data (e.g., encoded data) and can facilitate decoding such data, where, for example, the data can be read from a memory (e.g., 102) (not shown in FIG. 2), after such data has been converted from an analog signal to corresponding digital information by an analog-to-digital component (e.g., 114). In accordance with one embodiment of the disclosed subject matter, decoder component 104 can be an iterative decoder that can employ an LDPC code to facilitate decoding data.

The decoder component 104 can include a computation component 202 that can perform calculations associated with decoding data. The computation component 202 can perform all calculations associated with decoding data, such as probability calculations of $R_{mn}(a)$, $Q_{mn}(a)$, $P_n(a)$, and/or matrix operations (e.g., multiplication, addition, etc.), including H×X'(r).

The decoder component 104 can also include a comparator component 204 that can compare the value of H×X'(r) for the iteration to determine whether the result is equal to 0. The comparing component 204 can generate an output that can be provided to the decision component 206. If H×X'(r)=0, the decision component 206 can determine that the decoding result has attained the desired accuracy level (e.g., predefined accuracy criteria), and can provide and/or generate an output that can be the decoding result from the current iteration, which can be the final decoding result, and the decoder component 104 can stop decoding. The output can be a binary sequence(s) corresponding to and/or representing the original data value(s), for example, of data written to the memory 102. Such output can be provided to a host processor (not shown), cryptographic component (not shown), and/or other component, for example.

If H×X'(r)≠0, the decision component 206 can determine that the decoding result does not satisfy the predefined criteria, as the decision component 206 can determine that the decoding result violates at least one check equation based in part on the determination that H×X'(r)≠0. In such case, the decision component 206 can determine whether the maximum number of iterations has been reached. If the decision component 206 determines that the maximum number of iterations have been performed, then the decision component 206 can determine that the decoding result from the final iteration is the final decoding result, and/or can provide a message or indication that an error occurred in the decoding of the data, and/or can provide the data to another component (not shown) for further error correction. If the decision component 206 determines that the maximum number of iterations has not been reached, then the decision component 206 can communicate such iteration information to the computation component, and the computation component 202 utilize the decoding calculation results (e.g., probability calculation results) from the current iteration to facilitate calculating new decoding results based in part on the prior decoding results. The decision component 206 also can communicate such iteration information to the iteration component 208, and the iteration component 208 increments the iteration number. For example, the iteration component 208 can increase the iteration number by 1 (e.g., r=r+1, where r can be the iteration number). If a decoding result that has not met the desired threshold accuracy level (e.g., decoding result from iteration equal to maximum iteration), while not optimal, is provided as an output, the output can be a binary sequence(s) corresponding to and/or representing the original data value(s) (or virtually corresponding to and/or representing the original data value(s)), for example, of data written to the memory 102. Such output can be provided to a host processor (not shown), cryptographic component (not shown), and/or other component, for example.

In accordance with another embodiment of the disclosed subject matter, the decoder component 104 can also include a translation component 210 that can facilitate translating the multiplication and division computations associated with the decoding of the data into the log domain, so that the multiplication and division computations can be correspondingly changed into addition and subtraction computations. For example, the translation component can employ an FFT technique to translate the calculations into the log domain. Translating the multiplication and division calculations into the log domain can thereby reduce the workload for computation, hardware requirements, and the time to perform the computations to decode data.

Figure 3:
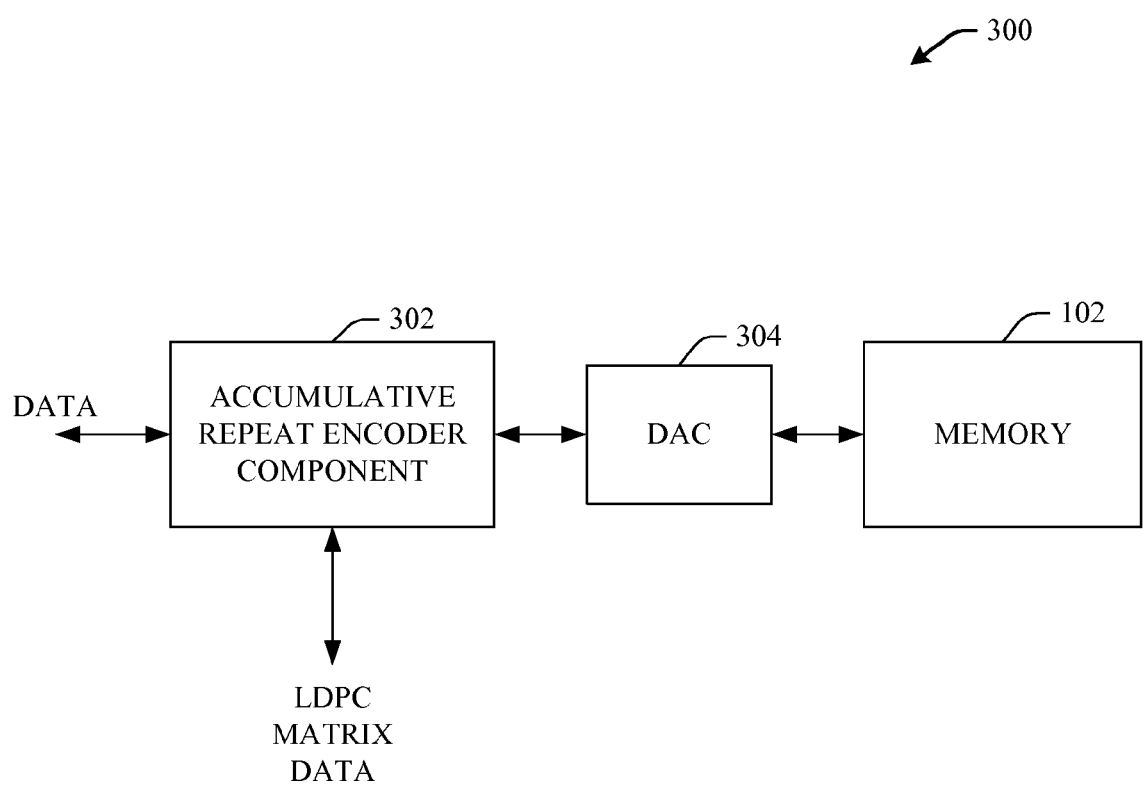
FIG. 3 depicts a block diagram of a system that facilitates generation of parity data to facilitate error correction of data stored in a memory in accordance with an aspect of the disclosed subject matter.

Turning to FIG. 3, depicted is a system 300 that can facilitate encoding data to facilitate error correction of data in accordance with an aspect of the disclosed subject matter. System 300 can include a memory 102 that can be utilized to store data via write operations and provide data via read operations, for example. The memory 102 can include such functionality as more fully described herein, for example, with regard to system 100.

System 300 can also include an accumulative repeat encoder component 302 (also referred to herein as "AREC 302") that can facilitate generating parity data (e.g. redundant information) that can be based in part on and/or associated with data (e.g., binary sequence(s), symbol sequence(s)) being written to the memory 102. The AREC 302 can receive data that is being written to the memory and/or LDPC matrix data, which can be used to facilitate generation of the parity data, as the parity data can be based in part on the LDPC matrix data. The AREC 302 can facilitate encoding the received data to generate the parity data, and can provide the encoded data as an output.

The output of encoded data can be provided to a digital-to-analog converter 304 (also referred to herein as "DAC 304") that can facilitate converting the data (e.g., encoded data) from a digital format into analog information (e.g., current level(s)) corresponding to the encoded data, so that the encoded data (in analog format) can be processed (e.g., stored in memory 102) in the analog domain.

To facilitate encoding of the data, the AREC 302 can utilize an LDPC code to facilitate generating redundant information. The LDPC code can be a capacity-approaching code such that the LDPC code can be optimal in terms of channel capacity, which can be the upper limit allowing information transmission or storage for a given media. A capacity-approaching code can theoretically use less redundancy and consume less power to reach a desired bit error ratio (BER) threshold, as compared to other types of codes that are not approaching capacity as closely as the LDPC code.

The LDPC code can be designed over a finite field GF(q) where $q \geq 2$. With AREC 302 being employed over GF(q), a binary input sequence, after properly being grouped, can be used to generate an output over a finite field GF(q). The value of q can be based in part on the number of bits of a memory location (e.g., memory cell) in memory 102, for example. Thus, for a memory cell that can store four bits of data, such as can be found in a quad-bit flash memory device (e.g., 102), q can equal four so that four elements over GF(4) can be used to represent the information of the four bits in the memory cell.

The AREC 302 can reference and utilize an (n, k) parity-check matrix H that can be employed for LDPC code, where $H=[H_1 \ H_2]$. $H_1$ can be a matrix that can have no weight-2 columns, no 4-cycle loop. In accordance with one embodiment, the $H_1$ matrix can be generated by a computer search. Since $H_1$ can have no weight-2 columns, $H_1$ can have at least three non-zero values (e.g., integer values in GF(q)) per column. $H_2$ can be a full-rank mm×mm matrix where mm=nn−kk, where kk can be the length of the data, nn can have a desired length (e.g. bit length, symbol length) that is greater than kk, and mm can be the redundant information that can be used to facilitate error correction of the data when the data is subsequently read from the memory 102. It is desirable for matrix H to be free of 4-cycle loop. In accordance with an aspect of the disclosed subject matter, matrix $H_1$ can be designed or structured, in view of the structure of matrix $H_2$, such that matrix H is free of 4-cycle loop. $H_2$ can have a transfer function of $1/(1+D)$, with the matrix of $H_2$ having a predetermined format illustrated as follows:

$$\begin{bmatrix} 1 & & & & & & \\ 1 & 1 & & & & & \\ & 1 & 1 & & & & \\ & & & \ldots \ldots \ldots & & & \\ & & & & 1 & 1 & \\ & & & & & 1 & 1 \\ & & & & & & 1 & 1 \end{bmatrix}$$

Such a structure of parity-check matrix H can ensure a recursive solution of the parity-check information. For example, the parity-check information can be determined recursively as follows: the first check equation, associated with the first row of matrix $H_2$, can relate to only the first parity-check symbol; the second check equation, associated with the second row of matrix $H_2$, can relate to the first two parity-check symbols; the third check equation, associated with the third row of matrix $H_2$, can relate to the next two parity-check symbols; and so on for the entire $H_2$ matrix, where each symbol can correspond to a respective storage level. Overall, the AREC 302 can generate parity-check information and can be of the concatenation of $H_1$ and $H_2$.

The AREC 302 can facilitate encoding the original data being written to the memory 102 by initially encoding the data based in part on the $H_1$ matrix. The AREC 302 can receive information associated with the $H_1$ matrix and can perform matrix multiplication of the sequence of original data (e.g., symbol sequence X) multiplied by the information associated with the $H_1$ matrix. Each symbol of the sequence is matrix multiplied with the corresponding item in the $H_1$ matrix, the respective resulting values obtained from the matrix multiplication of each symbol of the sequence with its corresponding item in the matrix $H_1$ can be summed together. The output from this initial encoding can then be integrated based in part on a transfer function. The transfer function can be associated with the $H_2$ matrix, which can be based in part on the size of the LDPC code. In one aspect, the transfer function can be $1/(1+D)$. Thus, the data generated based in part on the initial encoding with the $H_1$ matrix can be multiplied by the transfer function to generate parity data based in part on the $H_2$ matrix information. The encoded data generated by the AREC 302 can be provided as an output, where the encoded data can be based in part on the original data and parity data associated therewith.

The output of the AREC 302 can be converted to an analog signal(s) by the DAC 304, so that the encoded information, as represented in analog form, can be stored in the desired memory location in the memory 102. In accordance with one aspect of the disclosed subject matter, the original data can be represented by a corresponding analog signal(s), that can be correspondingly translated into charged electrons, that can be stored in a memory location(s) in the memory 102, and the associated parity data can be respectively represented as another analog signal(s), corresponding therewith, that can be translated into corresponding charged electrons, that can be stored in a different memory location(s) in the memory 102.

Figure 4:
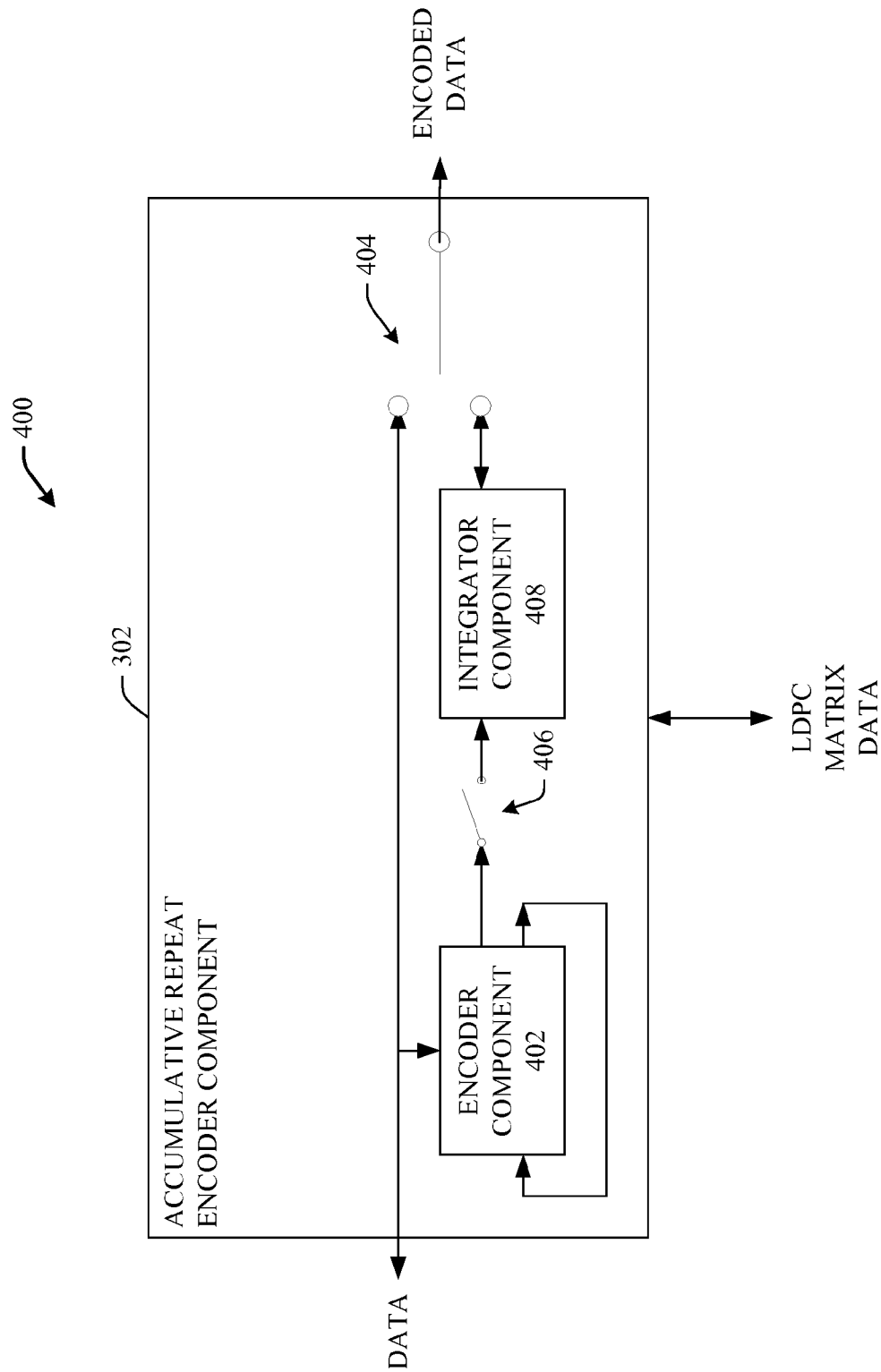
FIG. 4 illustrates a block diagram of a system that facilitates generation of parity data to facilitate error correction of data in accordance with an aspect of the subject matter disclosed herein.

Referring to FIG. 4, illustrated is block diagram of a system 400 that can facilitate encoding data to facilitate error correction of data in accordance with an aspect of the disclosed subject matter. System 400 can include an AREC 302 that can facilitate encoding received data, which can be binary sequences or symbol sequences (e.g., which can be generated by bit grouping), where, for example, such data can be data being written to a memory (e.g., 102). The AREC 302 can provide an output that can be encoded data, which can be associated with the received data but can also include parity-check information (e.g., parity data) that can be utilized to decode the encoded data, for example, when the data (e.g., encoded data) is read from a memory in order to perform error correction, as desired, with regard to the data, so that the read data can be an accurate representation of the data originally written to the memory.

In accordance with an aspect, the AREC 302 can receive data (e.g. binary sequence(s), symbol sequence(s)) to facilitate encoding of such data. The data can be provided as an output from the AREC 302, where a first switch 404 can be placed in a position to facilitate providing the data as an output, and the data can also be provided to an encoder component 402 that can be contained in the AREC 302. The encoder component 402 can receive the data and can reference and/or retrieve information (e.g., matrix data) associated with matrix $H_1$. The encoder component 402 can perform matrix multiplication of the received data (e.g., binary sequences, symbol sequences) multiplied by the $H_1$ matrix data to facilitate encoding of the received data and can generate an output of the matrix multiplication results. In one aspect, each piece of the sequence can be matrix multiplied with a corresponding item in the $H_1$ matrix, and the result of each such matrix multiplication can be fed back into the encoder component 402, where respective resulting values obtained from the matrix multiplication of each piece of the sequence with its corresponding item in the matrix $H_1$ can be summed together, for example, by an adder component (not shown). At this time a second switch 406 can be in an open position so that each piece of the initially encoded data can remain in the encoder component 402 until the entire data sequence is initially encoded by the encoder component 402.

After the initial encoding of the data is performed by the encoder component 402, the second switch 406 can be closed, so that the initially encoded data can be provided to an integrator component 408. The integrator component 408 can facilitate integrating such data and generating parity-check information associated with such data based in part on the LDPC code. The integrator component 408 can reference and/or retrieve matrix information associated with matrix $H_2$, which can be based in part on the LDPC code. The integrator component 408 can facilitate integrating such data (e.g., data initially encoded by encoder component 402) by receiving the pieces of data (e.g., bits, symbols) as such pieces of data are output from encoder component 402 and can multiply each such piece of data by a transfer function, where such transfer function can be $1/(1+D)$, for example, in accordance with matrix $H_2$ to facilitate generating parity data that can be associated with the original data sequence input to the AREC 302, where the parity data can be provided as an output. The first switch 404 can be placed in a position such that the parity data output from the integrator component 408 can be provided as an output from the AREC 302. In one aspect, the parity data associated with the original data sequence can be provided as an output from the AREC 302 after the original data sequence has been provided as an output from the AREC 302.

Figure 5:
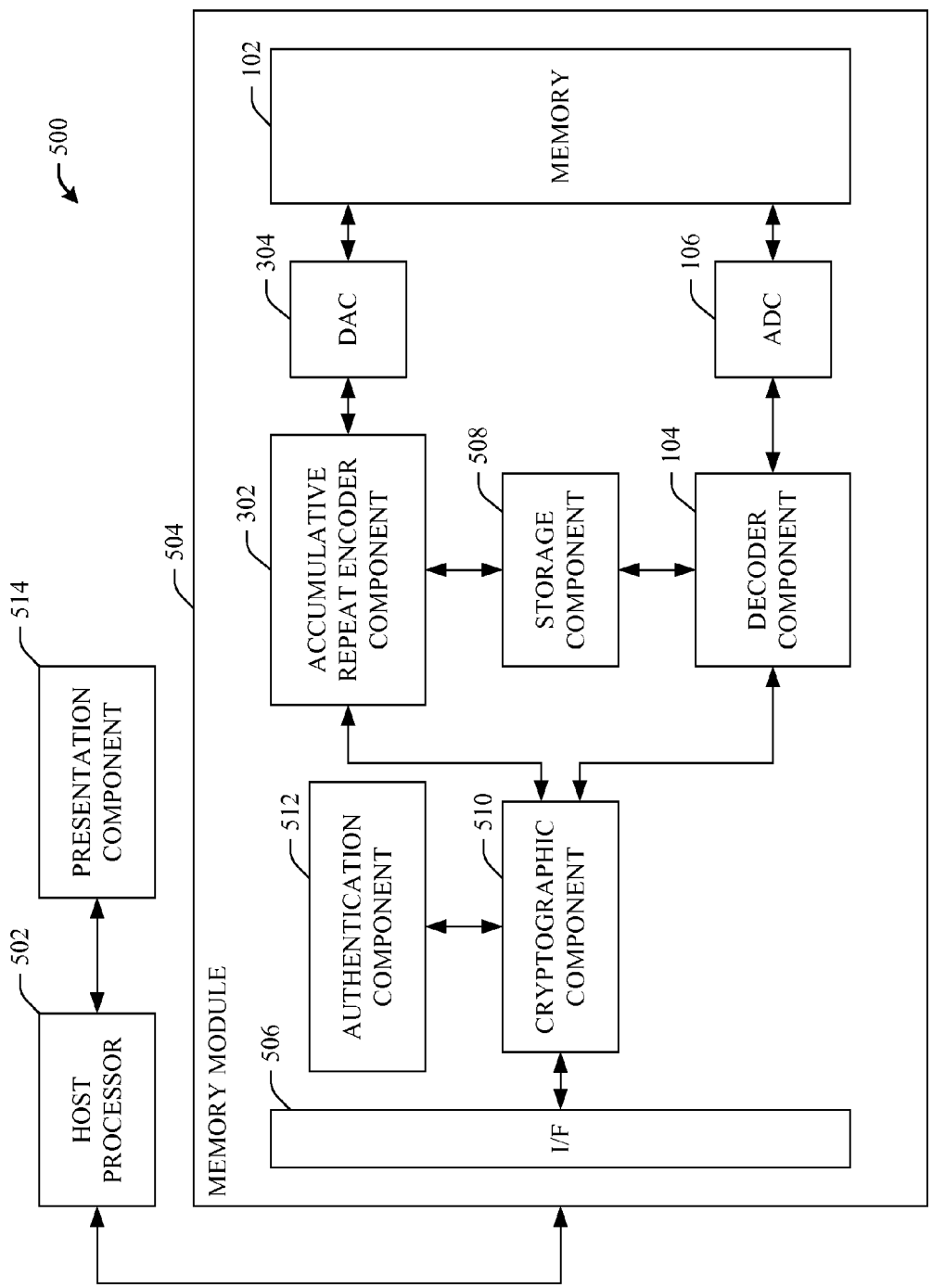
FIG. 5 depicts a block diagram of a system that facilitates error correction of secure data in accordance with an aspect of the disclosed subject matter.

FIG. 5 illustrates a block diagram of a system 500 that can facilitate error correction of secured data in accordance with an aspect of the disclosed subject matter. System 500 can facilitate data integrity of data that can be encrypted and/or decrypted to provide increased security with regard to such data. System 500 can include a host processor 502 can be associated with a memory module 504 that can facilitate securing and storing data. The memory module 504 can facilitate receiving data from and transmitting data to the host processor 502 via an interface component 506 (hereinafter also referred to as "interface 506" or "I/F 506"). The memory module 504 can include a memory 102, such as a flash memory device (e.g., single-bit flash memory, multi-bit flash memory), for example, that can store data in memory locations (e.g., memory cells) contained therein.

In accordance with an embodiment of the disclosed subject matter, the host processor 502 can be a typical applications processor that can manage communications and run applications. The host processor 502 can be a processor that can be utilized by, for example, a computer, a mobile handset, personal data assistant (PDA), or other electronic device. The host processor 502 can generate commands, including read, write, and/or erase commands, in order to facilitate reading data from, writing data to, and/or erasing data from the memory 102, where the communication of information between the host processor 502 and the memory 102 can be facilitated via the I/F 506.

I/F 506 can include and/or provide various adapters, connectors, channels, communication paths, etc. to integrate the memory module 504 into virtually any operating and/or database system(s) and/or with one another system(s). In addition, I/F 506 can provide various adapters, connectors, channels, communication paths, etc., that can provide for interaction and/or communication with the host processor 502, and/or any other component, data, and the like, associated with the system 500.

Memory module 504 can further include a decoder component 104 that can facilitate decoding (e.g. error correcting) data read from the memory 102. The decoder component 104 and/or the memory 102 can be associated with an ADC 106 that can convert read data, which can be in the form of analog information detected and/or read from the memory 102, into corresponding digital information (e.g., binary sequence(s)), so that the read data can be processed in the digital domain, for example, by the decoder component 104.

The memory module 504 can also include an AREC 302 that can facilitate encoding data being written to the memory 102. The AREC 302 and/or the memory 102 can be associated with a DAC 304, which can convert the encoded data output from the AREC 302, which can be in the form of digital information (e.g., binary sequence(s)), into corresponding analog information, so that the encoded data, in analog form, can be processed (e.g., stored) in the analog domain. It is to be appreciated that the memory 102, the decoder component 104, ADC 106, AREC 302, and DAC 304 can each include their respective functionality, as more fully described herein, for example, with regard to system 100, system 200, system 300, and/or system 400.

System 500 can further include a storage component 508 that can store information, such as matrix information related to matrix H, which can be comprised of matrices $H_1$ and $H_2$, such that $H=[H_1\ H_2]$. Storage component 508 can be comprised of non-volatile memory, such as read only memory (ROM), for example.

The host processor 502 via I/F 506 can be associated with a cryptographic component 510 that can facilitate encrypting and/or decrypting data to facilitate securing data being written to, stored in, and/or read from the memory 102. In accordance with an aspect of the disclosed subject matter, cryptographic component 510 can provide symmetric cryptographic tools and accelerators (e.g., Twofish, Blowfish, AES, TDES, IDEA, CAST5, RC4, etc.) to ensure that a specified partition (not shown) in memory component 102, or portions thereof, can only be accessed by those entities authorized and/or authenticated to do so. Cryptographic component 510 can also provide asymmetric cryptographic accelerators and tools (e.g., RSA, Digital Signature Standard (DSS), and the like) to ensure that a specified partition in memory 102, or portions thereof, only can be accessed by those entities that are authorized and certified to do so. Additionally, cryptographic component 510 can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in memory 102 is confined to those entities authorized to gain access.

System 500 can further include an authentication component 512 that can solicit authentication data from an entity, and, upon the authentication data so solicited, can be employed, individually and/or in conjunction with information acquired and ascertained as a result of biometric modalities employed, to facilitate control access to the memory 102. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 512. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 512 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

System 500 also can include a presentation component 514, which can be associated with the host processor 502. The presentation component 514 that provides various types of user interfaces to facilitate interaction between a user and any component coupled to the host processor 502. As depicted, the presentation component 514 is a separate entity that can be utilized with the host processor 502 and associated components. However, it is to be appreciated that the presentation component 514 and/or similar view components can be incorporated into the host processor 502 and/or a stand-alone unit. The presentation component 514 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 502.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed.

For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the memory module 504 can be situated or implemented in a single integrated-circuit chip. In accordance with another embodiment, the memory module 504 can be implemented in an application-specific integrated-circuit (ASIC) chip.

Figure 6:
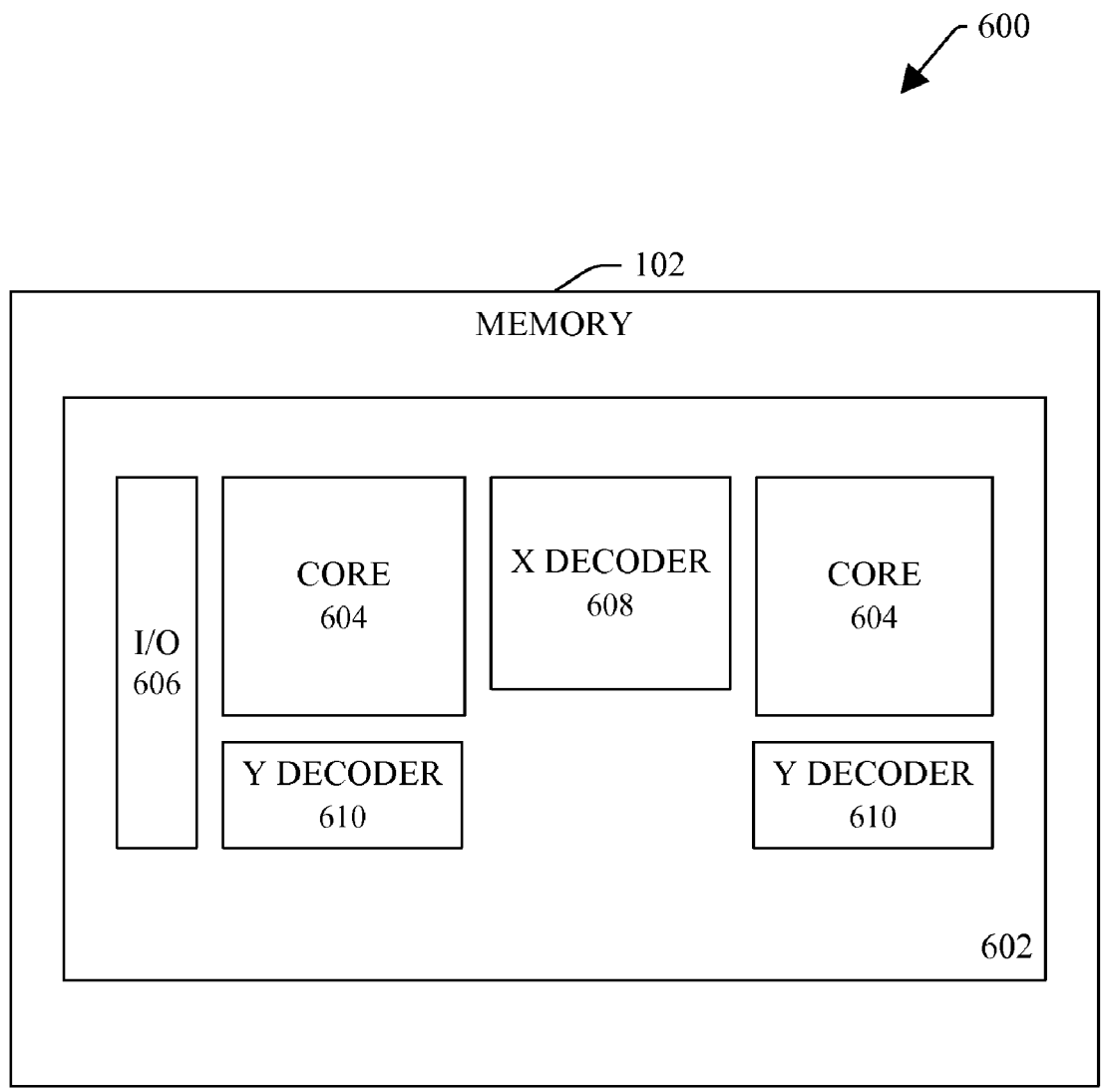
FIG. 6 depicts a block diagram of a memory system that facilitates data storage in accordance with an aspect of the disclosed subject matter.

Referring to FIG. 6, illustrated is a block diagram of a memory device 600 that facilitates storage of data in accordance with an aspect of the disclosed subject matter. The memory device 600 generally can include a memory 102 that can include a semiconductor substrate 602 in which one or more high-density core regions 604 and one or more lower-density peripheral regions can be formed. The high-density core regions 604 typically can include one or more M by N arrays of individually addressable, substantially identical multi-bit memory cells (not shown). The lower-density peripheral regions can typically include input/output (I/O) circuitry 606 and programming circuitry for selectively addressing the individual memory cells. The programming circuitry can be represented in part by and can include one or more x-decoders 608 and one or more y-decoders 610 that can cooperate with the I/O circuitry 606 for selectively connecting a source, gate, and/or drain of selected addressed memory cells to predetermined voltages or impedances to effect designated operations (e.g., programming, reading, erasing) on the respective memory cells, and deriving necessary voltages to effect such operations.

Figure 7:
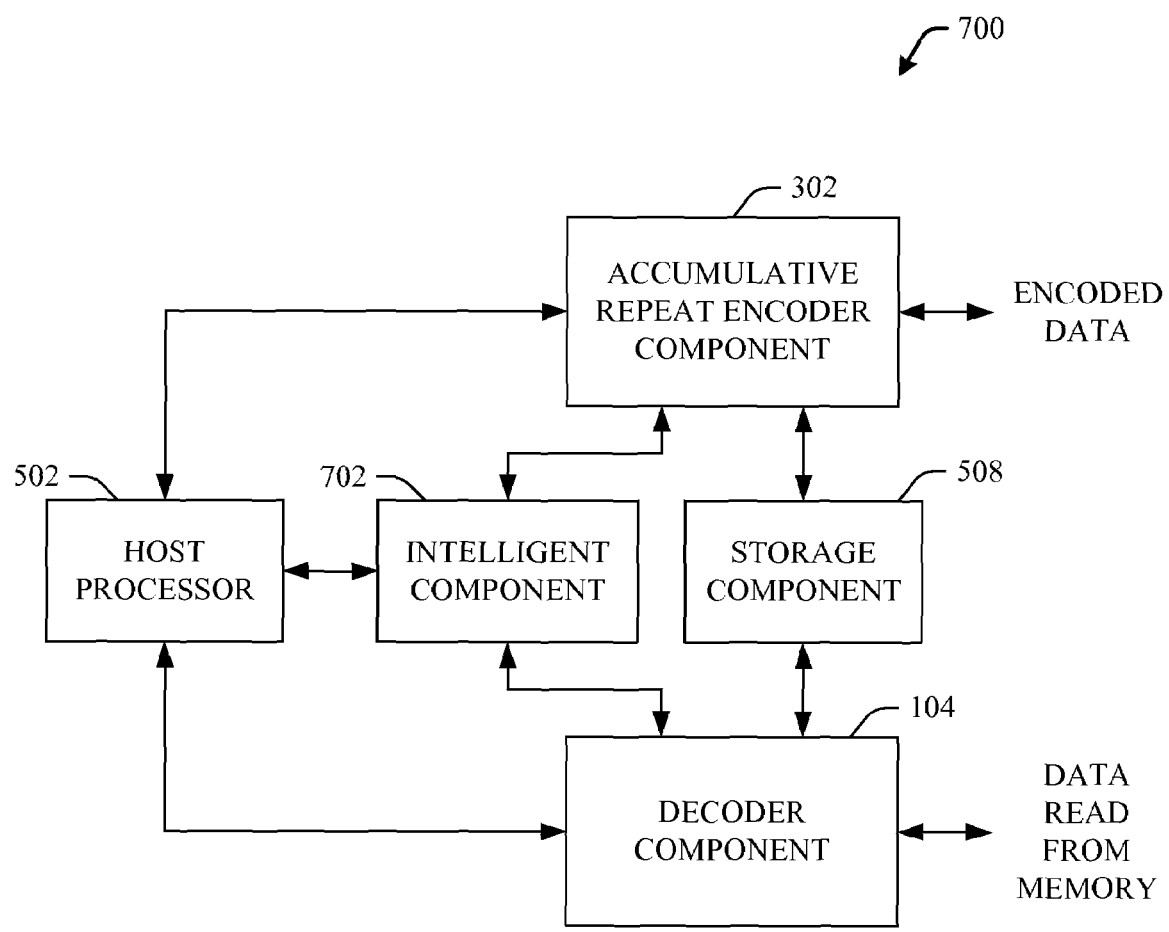
FIG. 7 illustrates a block diagram of a system that employs intelligence to facilitate error correction of data in accordance with an aspect of the disclosed subject matter.

Turning to FIG. 7, depicted is a block diagram of a system 700 that can employ intelligence to facilitate error correction of data in accordance with an aspect of the disclosed subject matter. System 700 can include a decoder component 104, the AREC 302, a host processor 502, and a storage component 508 that each can be substantially similar to respective components and can include such respective functionality as described herein, for example, with regard to system 100, system 200, system 400, system 500, and/or system 600.

The system 700 can further include an intelligent component 702 that can be associated with the decoder component 104 and/or AREC 302 to facilitate analyzing data and can make an inference(s) and/or a determination(s) regarding, for example, whether an error is detected during decoding of data, whether an error is corrected with regard to decoding of data, whether a desired threshold level of accuracy has been reached with regard to error correction of the data, whether data is encoded in accordance with the LDPC code, etc.

For example, the intelligent component 702 can infer whether an error is detected with regard to the data when the data read from the memory (e.g. flash memory) is being decoded. The intelligent component 702 can also infer whether an error has been corrected with regard to the data. Further, the intelligent component 702 can infer whether a desired accuracy level has been achieved in relation to decoding the data. In accordance with still another aspect, the intelligent component 702 can render an inference regarding whether a memory block or sector in memory 102 (not shown) is reliable, and can provide such inference information to another component(s) (e.g., host processor 502) that can be associated with the intelligent component 702, where, for example, such block or sector can be deemed (e.g., marked, identified) a bad block or bad sector and such bad block or bad sector will not be used for data storage thereafter. The intelligent component 702 can analyze such information and, based in part on current and/or historical evidence, can render an inference regarding whether an error is detected with regard to a binary sequence(s) of data, or a portion thereof, whether an error is corrected with regard to a binary sequence(s) of data, or a portion thereof, and/or whether a desired decoding result has been reached (e.g., the decoding result has achieved a desired threshold level of accuracy) with regard to a piece of data (e.g., binary sequence(s), symbol sequence(s)).

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 100, system 200, system 300, system 400, system 500, device 600, and/or system 700, or portions thereof, can be employed in virtually any electronic device where security of data is desired. Examples of such electronic devices can include a computer, a cellular phone, a digital phone, a video device (e.g., video playing and/or recording device), a smart card, a personal digital assistant (PDA), a television, an electronic game (e.g., video game), a digital camera, an electronic organizer, an audio player and/or recorder, an electronic device associated with digital rights management, Personal Computer Memory Card International Association (PCM-CIA) cards, trusted platform modules (TPMs), Hardware Security Modules (HSMs), set-top boxes, secure portable tokens, Universal Serial Bus (USB) tokens, key tokens, secure memory devices with computational capabilities, devices with tamper-resistant chips, a navigation system (e.g., global position satellite (GPS) system), an electronic device associated with an industrial control system(s), an embedded computer in a machine (e.g., an airplane, a copier, a motor vehicle, a microwave oven), and the like.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 8-13 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
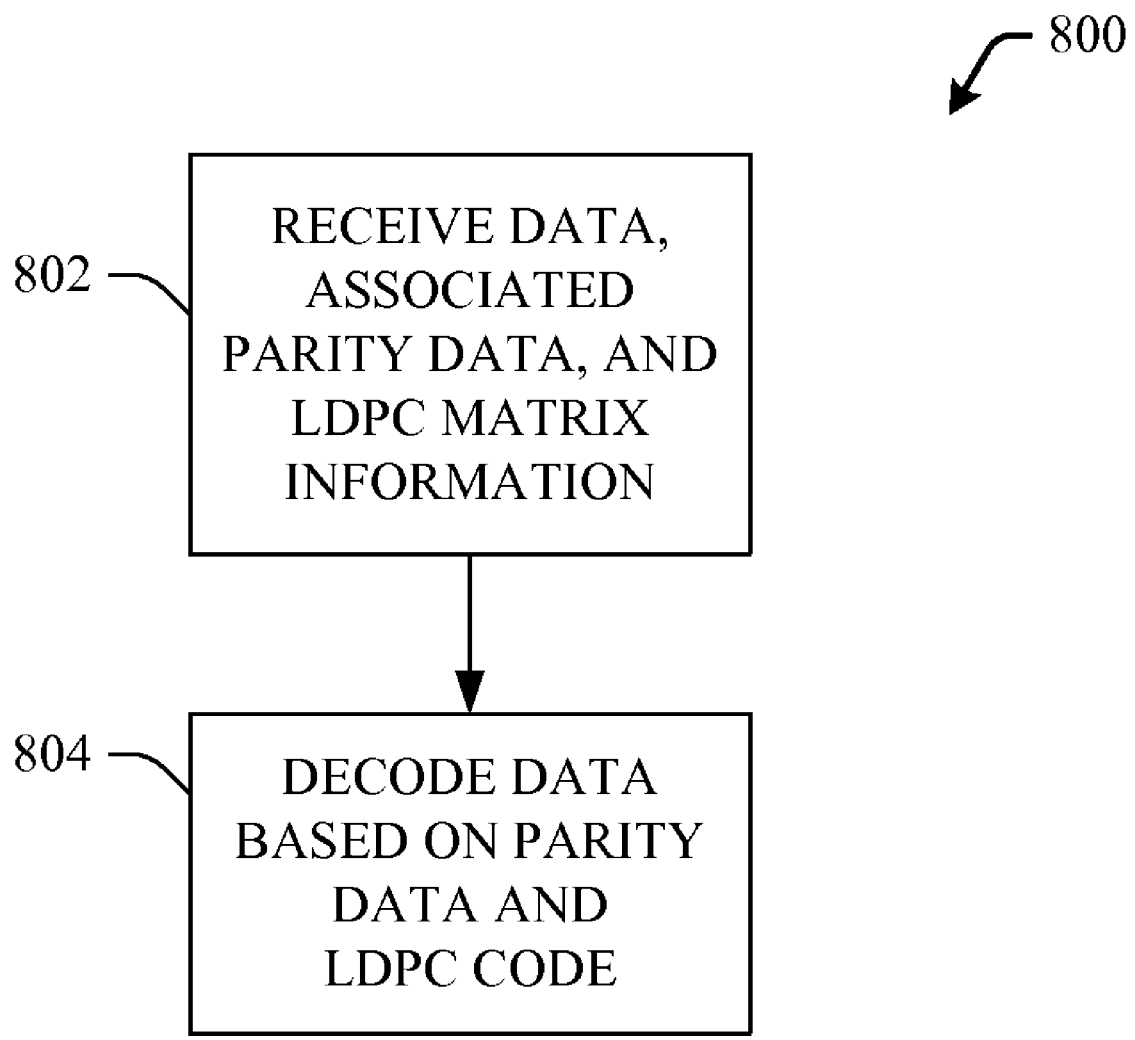
FIG. 8 illustrates a methodology that facilitates error correction of data in accordance with an aspect of the subject matter disclosed herein.

Referring to FIG. 8, a methodology 800 for error correction of data in accordance with an aspect of the disclosed subject matter is illustrated. At 802, data, parity data associated with the data, and/or information associated with a matrix based in part on an LDPC code can be received, for example, by a decoder component (e.g., 104). The matrix information can include information associated with an $H_1$ matrix and/or an $H_2$ matrix based in part on the LDPC code. In accordance with one embodiment of the disclosed subject matter, the decoder component can be an iterative decoder that can facilitate error correcting data read from a memory location(s) in a memory (e.g., 102) utilizing an LDPC code. At 804, the data can be decoded (e.g., error corrected) based in part on the associated parity data and LDPC matrix information. For example, the decoder component can use the parity data associated with the data and the information from the matrix associated with the LDPC code to facilitate error correcting the data read from the memory. At this point, methodology 800 can end.

Figure 9:
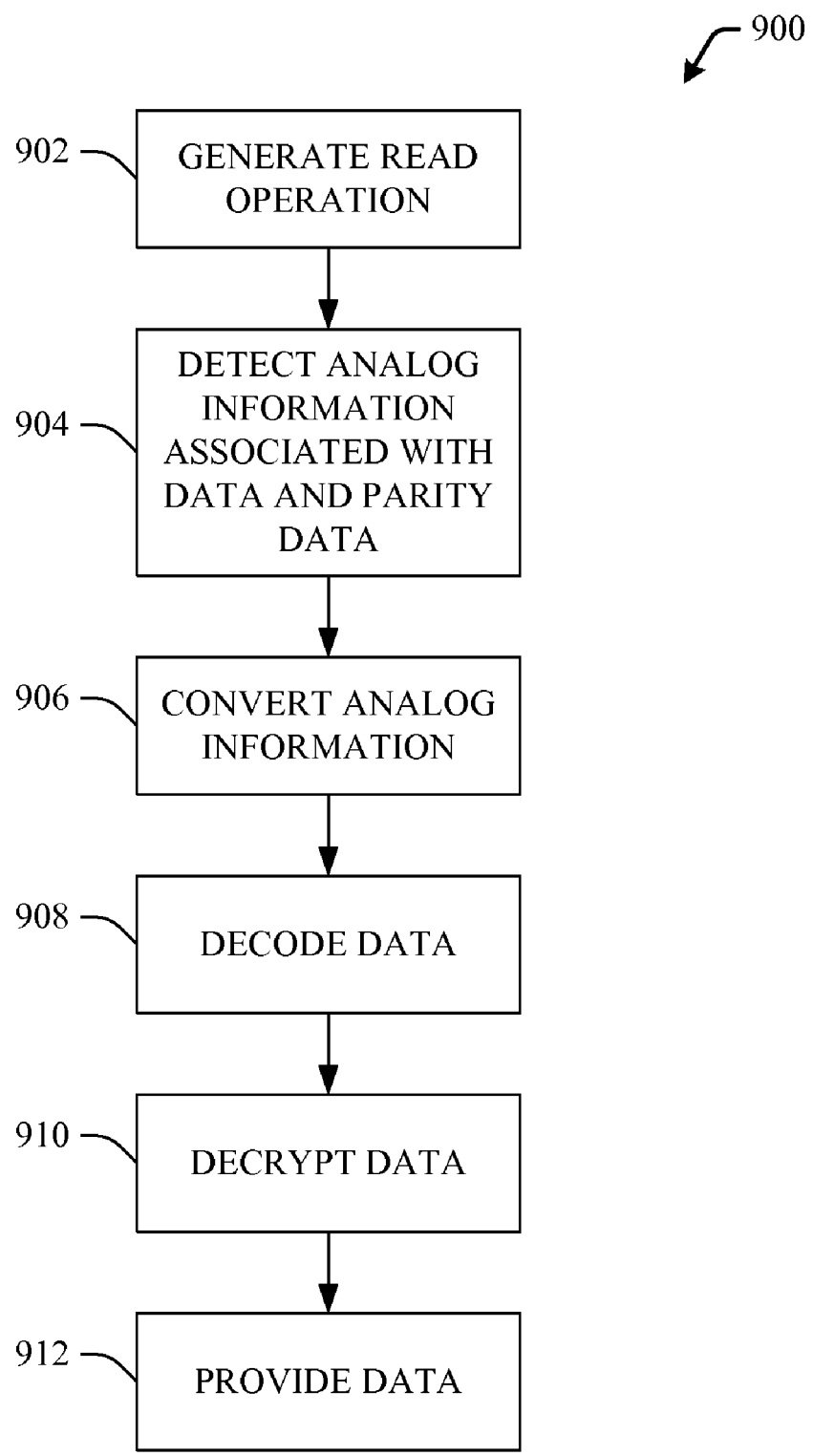
FIG. 9 depicts a methodology that facilitates error correction of data read from a memory in accordance with an aspect of the disclosed subject matter.

Turning to FIG. 9, illustrated is a methodology 900 that facilitates error correction of data read from a memory in accordance with an aspect of the disclosed subject matter. At 902, a read operation can be generated, for example, by a host processor (e.g., 502). The read operation or command can specify a memory address(es) associated with a memory location(s) in the memory (e.g., 102), such as flash memory (e.g., multi-bit flash memory) where the desired data can be stored. In accordance with as aspect of the disclosed subject matter, the desired data can be encrypted data. At 904, analog information (e.g., current level(s)) that can be based in part on the charge stored in the memory location(s) can be detected, where the stored charge(s) can represent the stored data and/or parity data associated with the stored data. At 906, the analog information can be converted into a digital signal (e.g., digital data) that can represent the analog information in a digital form so that such information can be utilized and/or processed in the digital domain. For instance, an ADC (e.g., 106) can facilitate converting the analog information into a digital signal.

At 908, the digitized data can be decoded (e.g. error corrected) based in part on an LDPC code using the digitized parity data associated therewith as well as information retrieved from matrices $H_1$ and $H_2$, which can be stored in a storage component (e.g., 508).

At 910, the decoded data can be decrypted based in part on a cryptographic protocol employing a cryptographic algorithm. At 912, the decrypted data can be provided, for example, to the host processor and/or another component, as desired. For instance, the decrypted data can be displayed in a GUI so that it can be perceived and/or manipulated by a user. At this point, methodology 900 can end.

Figure 10:
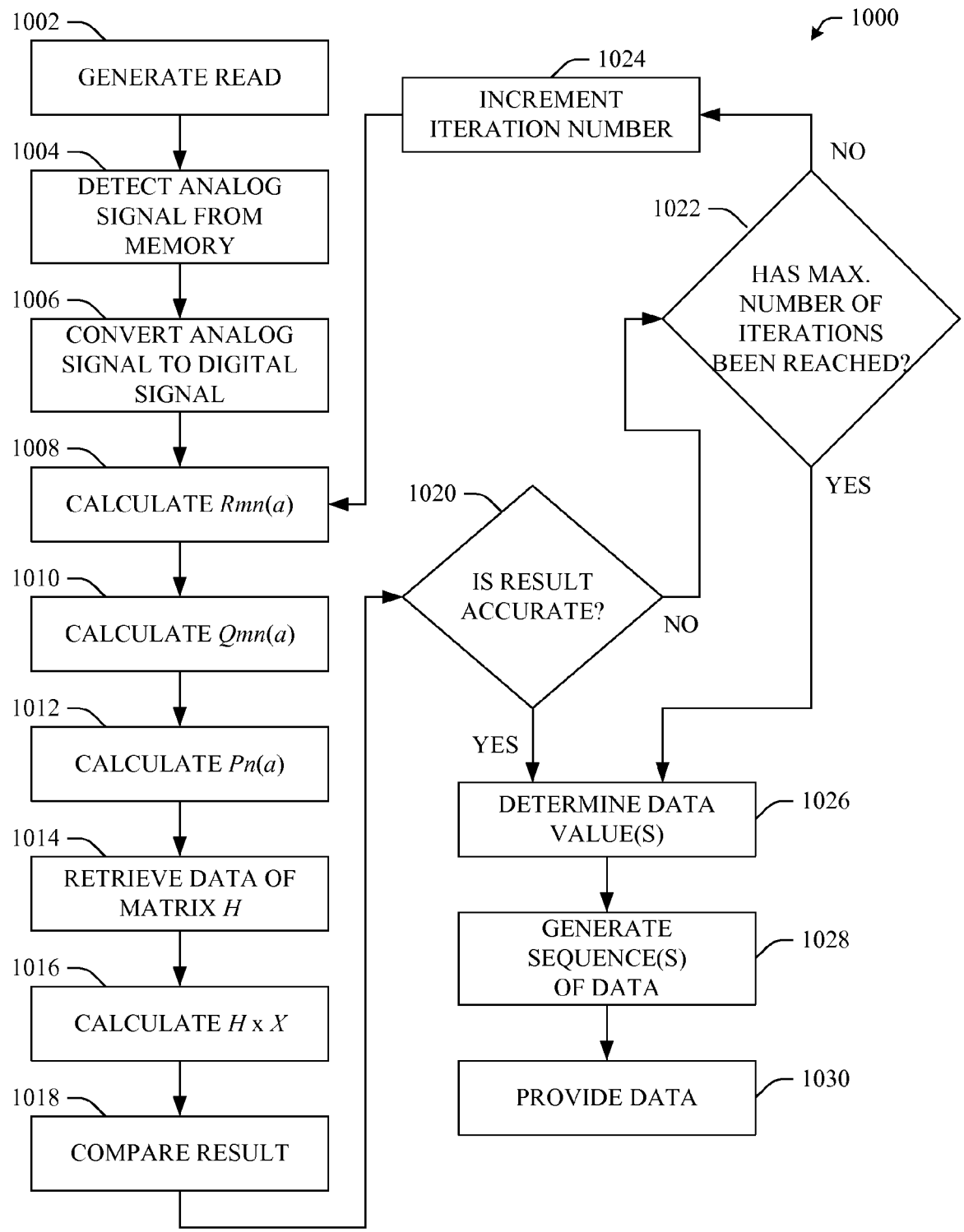
FIG. 10 illustrates another methodology that facilitates error correction of data read from a memory in accordance with an aspect of the disclosed subject matter.

FIG. 10 depicts a methodology 1000 for error correction of data read from a memory in accordance with an aspect of the disclosed subject matter. At 1002, a read operation can be generated, for example, by a host processor (e.g., 502). The read operation or command can include information regarding a memory address(es) associated with a memory location(s) in the memory (e.g., 102), such as flash memory (e.g., multi-bit flash memory) where the desired data can be stored and from which the desired data can be read. In accordance with as aspect of the disclosed subject matter, the desired data read from the memory location(s) can be encrypted data. At 1004, analog information (e.g., current level(s)) that can be based in part on the charge stored in the memory location(s) can be detected, where the stored charge(s) can represent the stored data and/or parity data associated therewith. At 1006, the analog information can be converted into a digital signal (e.g., digital data), for example, by an ADC (e.g., 106), where the digital signal can represent the analog information in a digital form so that such information can be utilized and/or processed in the digital domain.

At 1008, $R_{mn}(a)$ can be calculated. $R_{mn}(a)$ can be the probability that, corresponding to matrix H, at location of row m and column n (that is, H(m,n), equivalently, symbol n for the $m^{th}$ check), the element is chosen as value a. For instance, $R_{35}(2)$ can mean the probability when the element at H(3,5) can be assumed to be equal to 2. In accordance with one aspect of the disclosed subject matter, $R_{mn}(a)$ can be calculated using the following equation:

$$R_{mn}(a) = \sum_{X:x_n=a} P(z_m = 0 \mid X) \prod_{k \in N(n) \backslash n} Q_{mk}(x_k)$$

At 1010, $Q_{mn}(a)$ can be calculated. $Q_{mn}(a)$ can be the probability of elements within matrix H on the $m^{th}$ check (e.g., along row m) and all the other non-zero elements on column n to be element a. Symbols can pass certain probability information between the given symbol sequence through a check constraint. Matrix H can provide a constraint of the symbol sequence. Each symbol within the sequence can correspond to a column of matrix H. Since any row or column of matrix H can be non-zero, probability information from column i (corresponding to symbol i) can be passed into column j (corresponding to symbol j) through a shared row. For example, row k can connect two columns, where the elements at the interconnection of k and i, and k and j can be non-zero. Similarly, each row of matrix H can correspond to a check point, and elements within each row, where multiplying the corresponding symbols in the sequence can establish a constraint (e.g., check). The number of rows can be equal to the number of constraints. Information from each check point can propagate to another check point through the interconnection on the same column and/or symbol. Such information can contain and/or can facilitate determining the probability of the check being satisfied.

The information can alternatively run vertically or horizontally before the decoding of a piece of data is completed, where the decoding of the piece of data can occur when either the maximum number of decoding iterations is reached or all of the check constraints associated with a particular symbol sequence are met (e.g. predefined accuracy criteria is met), where the symbol sequence can be the expected decoded symbol sequence.

In accordance with an aspect of the disclosed subject matter, $Q_{mn}(a)$ can be calculated as follows:

$$Q_{mn}(a) = \alpha_{mn} f_n(a) \prod_{k \in M(n) \backslash n} R_{kn}(a)$$

At 1012, $P_n(a)$ can be calculated. $P_n(a)$ can be an a posteriori probability of when symbol n can be decoded as a. For example, $P_n(a)$ can be computed utilizing the following equation:

$$P_n(a) = \alpha_n f_n(a) \prod_{k \in M(n)} R_{kn}(a)$$

In the above equation, $f_n(a)$ can be the a priori probability and the term within the product can be obtained by multiple iterations. $P_n(a)$ can be utilized to implement hard decoding, that is, for each given n, locate the largest $P_n(a)$ over a, and the corresponding value of a at that point can be the decoding result for that iteration.

At 1014, data associated with matrix H can be retrieved, for example, from a storage component (e.g., 508) wherein the matrix H data can be stored. At 1016, H×X can be calculated, where H can be comprised of matrices $H_1$ and $H_2$, where $H_2$ can be associated with parity data based in part on the LDPC code, and X can be comprised of $x_1$ and $x_2$. At 1016, the result of the calculation of H×X can be compared to determine whether the result is 0, which can indicate that the decoding result has reached a desired accuracy threshold level (e.g., the decoding result has satisfied the check equation and satisfies the predefined accuracy criteria) with regard to whether the decoding result accurately represents the data originally written to the memory. At 1020, a determination can be made as to whether the decoding result has reached the desired accuracy threshold level. If the result is not 0, it can be determined that the decoding result has not achieved the desired accuracy threshold level (e.g., the decoding result violates at least one check equation), and then, at 1022, a determination can be made as to whether a predetermined maximum number of iterations has been reached. If it is determined that the maximum number of iterations has not been reached, then, at 1024, the iteration number can be incremented. For example, the iteration number r can be incremented by 1, such that r=r+1. Methodology 1000 can then return to reference numeral 1008 to begin the next iteration. If, at 1022, it is determined that the maximum number of iterations has been reached, then methodology 1000 can proceed to reference numeral 1026.

Turning back to reference numeral 1020, if the result is 0, then it can be determined that the decoding result has reached the desired threshold level of accuracy (e.g., predefined accuracy criteria is met), and methodology 1000 can proceed to reference numeral 1026.

At 1026, data values can be determined, where the data values can be associated with the decoding result of the current iteration. For example, the decoding result can be the symbol sequence associated with the current iteration. At 1028, one or more sequences of data based in part on the decoding result can be generated, for example, by the decoder component 104. At 1030, the data (e.g., symbol sequence(s), binary sequence(s)) can be provided as an output, for example, to another component, such as a host processor (e.g. 502) or cryptographic component (e.g., 510), or other component. At this point, methodology 1000 can end.

Figure 11:
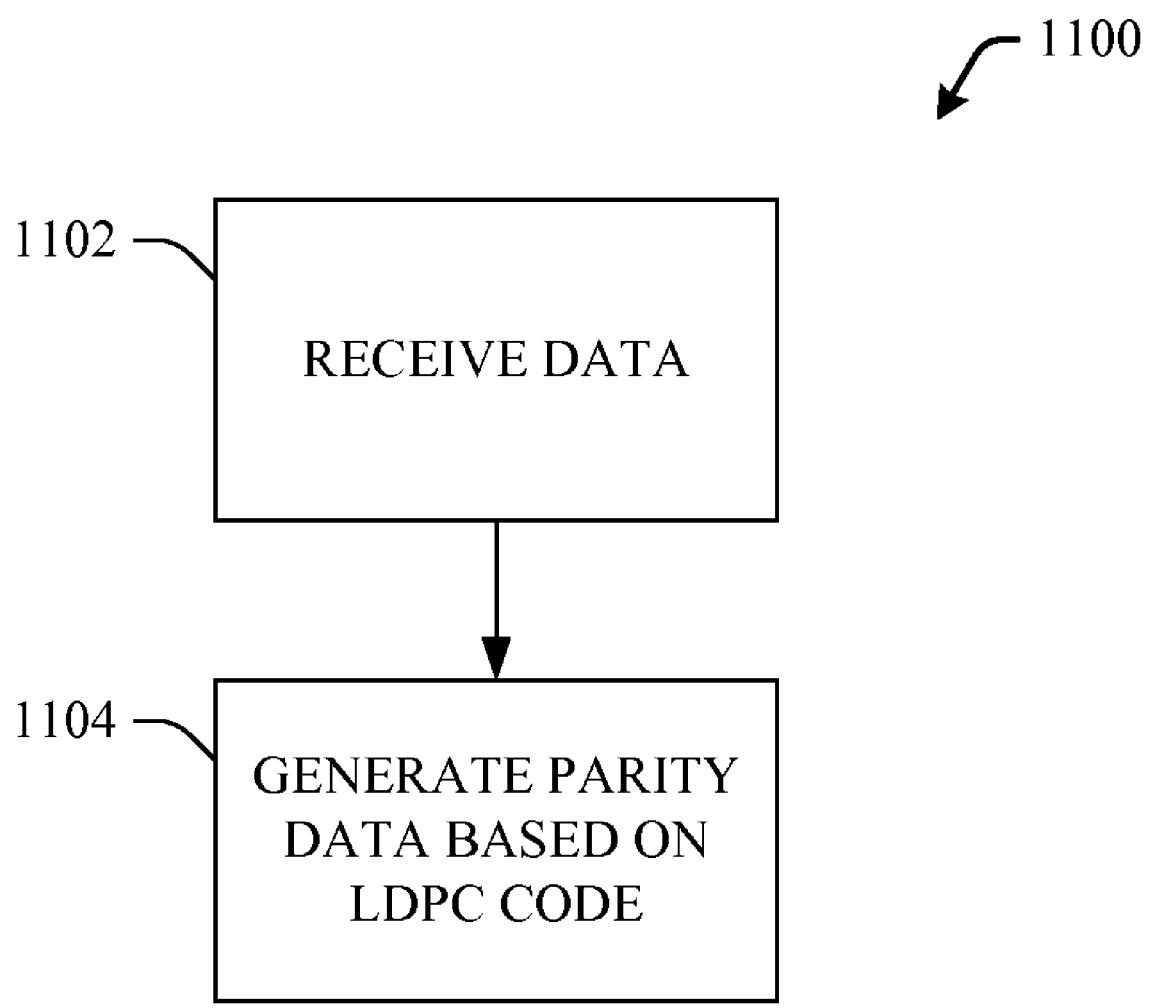
FIG. 11 illustrates a methodology that facilitates encoding data to facilitate error correction of data in accordance with an aspect of the disclosed subject matter.

Referring to FIG. 11, a methodology 1100 that facilitates encoding of data to facilitate error correction of data in accordance with an aspect of the disclosed subject matter is illustrated. At 1102, data can be received. In accordance with an aspect of the disclosed subject matter, the data can be received by an encoder, such as an accumulative repeat encoder component (AREC) (e.g., 302) that can facilitate encoding data being written to a memory (e.g. 102), such as a flash memory, during a programming operation The data can be received from another component, such as a host processor (e.g. 502), or a cryptographic component (e.g., 510), where the data can first be encrypted before being provided to the encoder.

At 1104, parity data associated with the received data can be generated, where the parity data can be based in part on the data and/or in accordance with an LDPC code. The data and associated parity data can be stored in desired memory location(s) in the memory (e.g., 102), where the parity data can facilitate error correcting of the data when the data is read from the memory. In accordance with an aspect of the disclosed subject matter, the parity data can be generated by an AREC that can reference and/or retrieve matrix information associated with the LDPC code from a storage component (e.g., 508). The matrix information can facilitate generating parity data to encode the data in accordance with the LDPC code. At this point, methodology 1100 can end.

Figure 12:
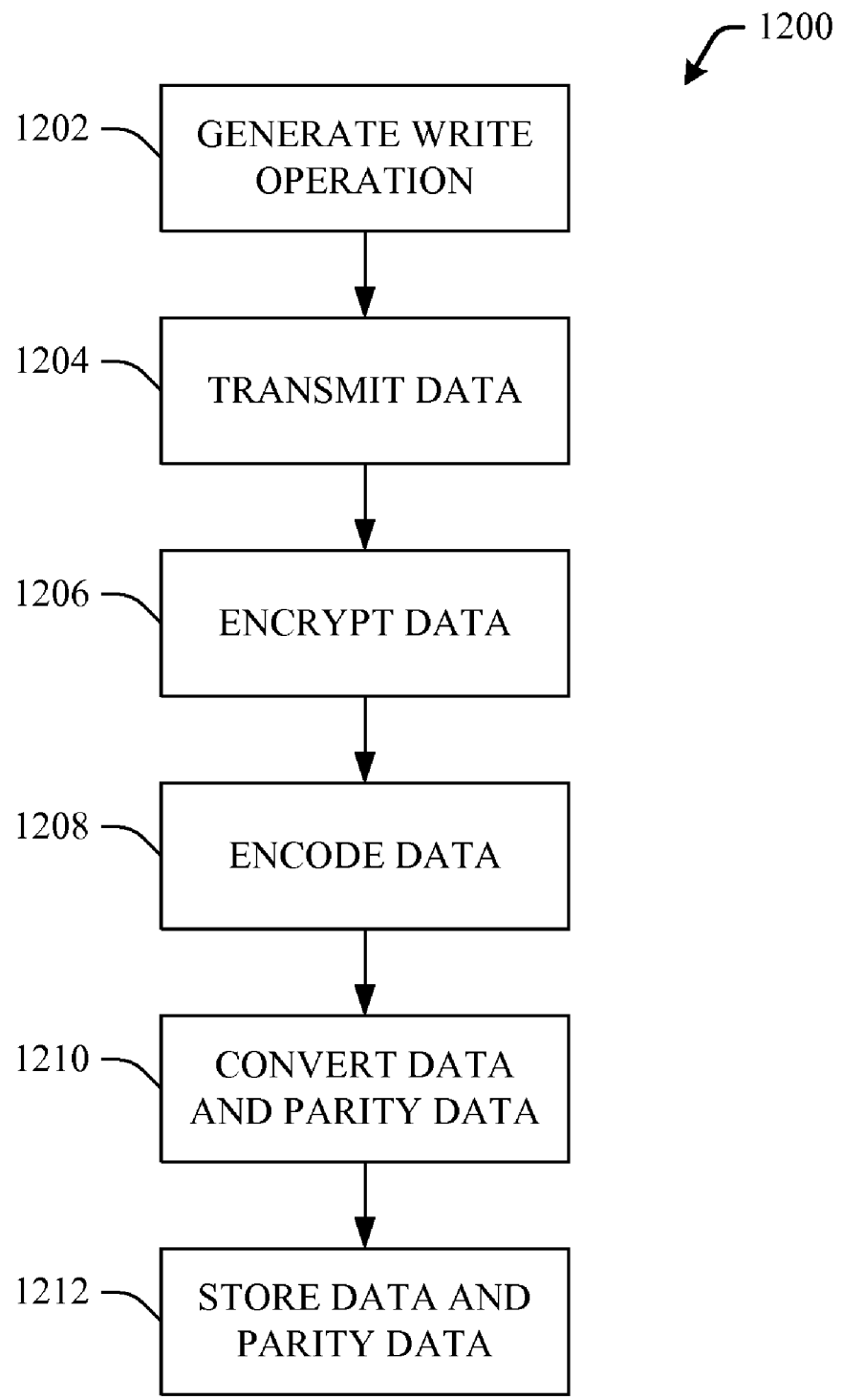
FIG. 12 illustrates a methodology that facilitates encoding data to facilitate error correction of data stored in a memory in accordance with an aspect of the disclosed subject matter.

Turning to FIG. 12, illustrated is a methodology 1200 that facilitates encoding of data to facilitate error correction of data in accordance with an aspect of the disclosed subject matter. At 1202, a write operation can be generated to write data to a memory (e.g., 102), such as a flash memory (e.g., single-bit flash memory, multi-bit flash memory). The write operation or command can include, for example, information regarding the data to be written to the memory, memory address information related to the memory location(s) in the memory to which the data is being written, etc. In accordance with an aspect of the disclosed subject matter, a host processor (e.g., 502) can generate the write command.

At 1204, the data associated with the write operation can be transmitted. For example, the data can be transmitted from a buffer component (not shown) or other temporary storage to a cryptographic component (e.g., 510) to facilitate encryption of the data being written to the memory. At 1206, the data can be encrypted according to a desired cryptographic protocol to facilitate securing the data. For example, the cryptographic component can encrypt the data using an RSA-based algorithm to facilitate securing the data from attackers or other entities not authorized to access such data.

At 1208, the data (e.g., encrypted data) can be encoded. In accordance with an aspect of the disclosed subject matter, the data can be encoded using an LDPC code. The data can be encoded by an encoder, such as an AREC (e.g., 302), that can facilitate generating parity data based in part on the data and/or the LDPC code, where the parity data can be associated with the data being written to the memory, and the parity data can facilitate decoding (e.g. error correcting) the data when it is subsequently read from the memory.

At 1210, the data and the parity data can be converted from digital information into analog information (e.g., corresponding current level). In accordance with one aspect, a digital-to-analog converter (e.g., 304) can facilitate converting the data and associated parity data from a digital signal (e.g. symbol sequence) into an analog signal(s), which can be a current level(s) that can correspond to the data and associated parity data, so that such data and associated parity data can be processed (e.g., stored in memory) in the analog domain.

At 1212, the data and parity data, in analog form, can be stored in the desired memory location(s) (e.g., memory cell(s)) in the memory. For example, the current level(s) respectively corresponding to the data and associated parity data can be provided to the desired memory cell(s) to facilitate storing a charge(s) in the memory cell(s) that can correspond to the respective values of the data and associated parity data, as they were in their digital form. In one aspect, the analog representation of the data can be stored in one memory location and the analog representation of the associated parity data can be stored in another memory location in the memory. At this point, methodology 1200 can end.

Figure 13:
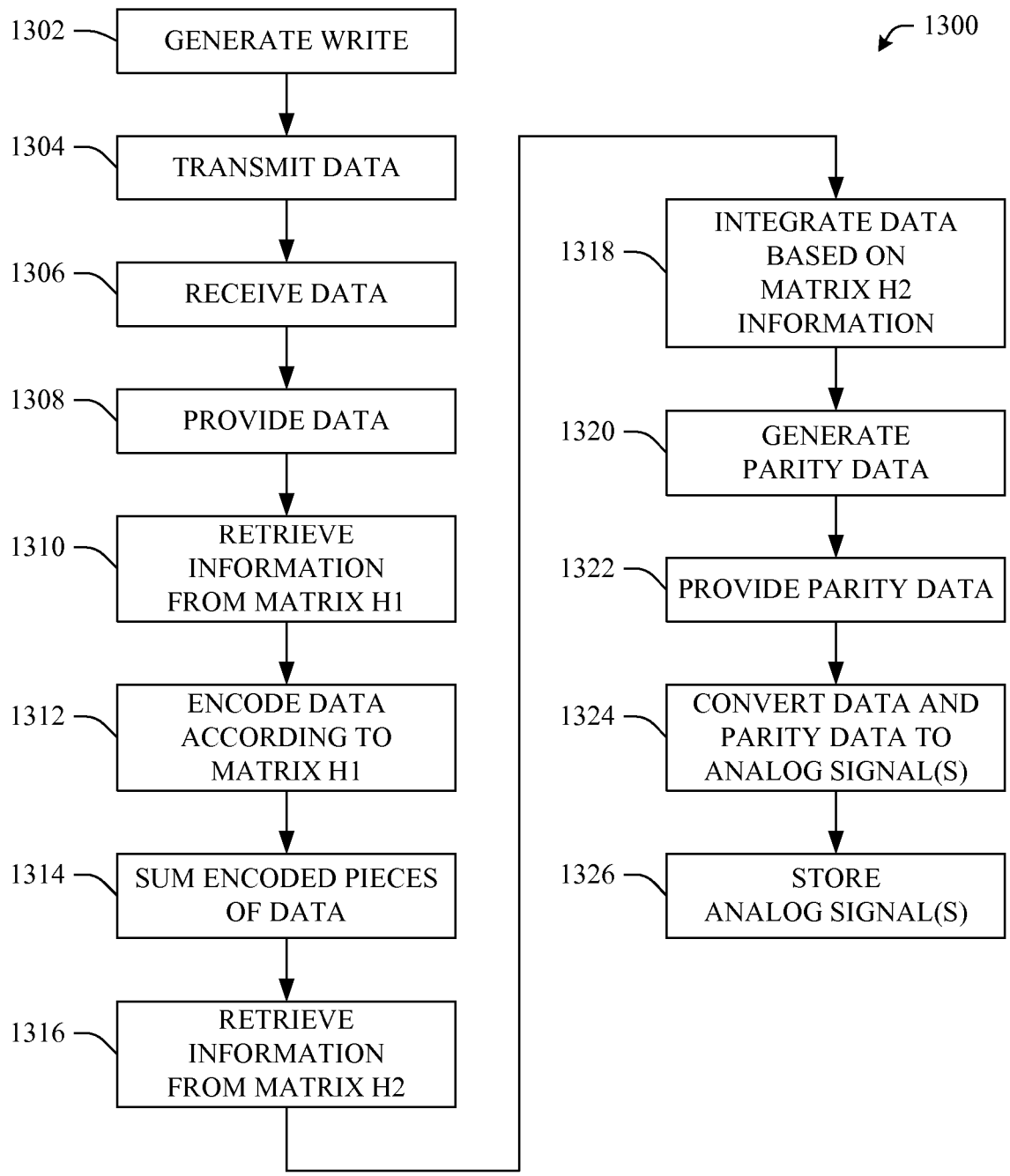
FIG. 13 illustrates another methodology that facilitates encoding data to facilitate error correction of data stored in a memory in accordance with an aspect of the subject matter disclosed herein.

FIG. 13 depicts a methodology 1300 that facilitates encoding data to facilitate error correction of data in accordance with an aspect of the disclosed subject matter. At 1302, a write operation (e.g., write command) can be generated to write data to a memory (e.g., 102), such as a flash memory. The write operation or command can include, for example, information regarding the data to be written to the memory, memory address information associated with the memory location(s) in the memory to which the data is being written, etc. In accordance with an aspect of the disclosed subject matter, a host processor (e.g. 502) can generate the write command.

At 1304, the data associated with the write operation can be transmitted. For example, the data can be transmitted from a buffer component (not shown) or other temporary storage. In accordance with an aspect of the disclosed subject matter, the data can be encrypted, for example, in accordance with a desired cryptographic protocol to facilitate securing the data. In accordance with another aspect, the data can be a sequence of data (e.g., binary sequence, symbol sequence) that can contain a predetermined number of bits, if a binary sequence, or a predetermined number of symbols, if a symbol sequence.

At 1306, the data can be received. In one aspect, the data can be received by an AREC (e.g., 302) that can facilitate encoding the data and generating parity data that can be utilized to facilitate error correction of the data when it is subsequently retrieved and/or read, for example, from a memory (e.g. 102). At 1308, the data can be provided. In one aspect, the data can be provided in its original form as an output from the AREC, and can also be provided to an encoder component (e.g., 402) that can be associated with the AREC to facilitate encoding the data.

At 1310, matrix information associated with an $H_1$ matrix can be retrieved. In accordance with one aspect, the matrix information can be retrieved from a storage component (e.g., 508). In accordance with an aspect, the matrix information can include information from a first matrix, $H_1$, which can be associated with and/or based in part on an LDPC code. The $H_1$ matrix information can facilitate encoding the data in accordance with the LDPC code. The $H_1$ matrix can be a sparse matrix that has no weight-2 columns and no 4-cycle loop. In accordance with one aspect, the $H_1$ matrix can be generated by a computer search or can be generated by another suitable device.

At 1312, the data (e.g., symbol sequence(s)) can be encoded based in part on the first matrix $H_1$. In accordance with one aspect, the encoder component (e.g., 402) can facilitate performing the initial encoding of the data. Each symbol of the symbol sequence(s) of data, which can be associated with a matrix X, can be matrix multiplied by the $H_1$ matrix to encode the data, where, for example, the symbol sequence can be represented as $x_1$ (a part of matrix X) and the encoding process can comprise in part calculating $H_1 \times x_1$. At 1314, the data results (e.g. encoded data) of the matrix multiplication can be summed. In one aspect, as each symbol of $x_1$ is matrix multiplied by $H_1$ to produce a matrix multiplication result, each such result can be fed back into the encoder component where the results can be summed together, for example, by an adder component to accumulatively encode the data based in part on the LDPC code, as more fully described herein.

At 1316, information associated with a second matrix, $H_2$, can be retrieved or referenced. The second matrix $H_2$ can be structured based in part on the LDPC code and can be stored in the storage component. The $H_2$ matrix information can be used to facilitate generating parity data (e.g., redundant information) associated with the data to facilitate decoding the data when it is later read from the memory. The matrix $H_2$ can be a full-rank mm×mm matrix where mm=nn−kk, where nn can be the desired amount of redundancy and kk can be the width of the data (e.g., bit width of the data, symbol width of the data) and the $H_2$ matrix can correspond to a transfer function, which can be 1/(1+D) in accordance with an aspect of the disclosed subject matter.

At 1318, each symbol of the initially encoded data (e.g., $H_1 \times x_1$) can be integrated based in part on the $H_2$ matrix information. The integration of the initially encoded data can be performed by an integrator component (e.g., 408), for example. Such data can be multiplied by a transfer function (e.g., 1(1+D)) associated with the $H_2$ matrix to facilitate generating parity data based in part on the LDPC code. At 1320, parity data associated with the data being written to the memory can be generated. The parity data can be generated based in part on the $H_2$ matrix information and associated transfer function, where, for example, the parity data can be the result of the matrix multiplication of $H_2 \times x_2$. At 1322, the parity data (e.g. $H_2 \times x_2$) can be provided as an output. In one aspect, the parity data can be provided as an output from the integrator component, which can then be output from the AREC, for example, after a switch (e.g. 404) is positioned to facilitate the output of the parity data.

At 1324, the encoded data, which can be comprised of the original data and associated parity data, can be converted from a digital form (e.g., binary sequence, symbol sequence) to a corresponding analog signal(s) (e.g., current level(s)), so that the data and associated parity data can be further processed in the analog domain. In accordance with one aspect, the encoded data can be converted using a digital-to-analog converter (e.g., 304). At 1326, the analog signal(s) (e.g., analog information) can be stored, for example, in a desired memory location(s) in the memory, where an analog signal(s) can represent the encoded data, which can be the data being written to memory and associated parity data. An analog signal can be a current level that can be used to store charge in a selected memory location(s) (e.g., memory cell(s)) in the memory. In one aspect, the analog information associated with the data can be stored in one memory location and the analog information associated with the parity data, associated with the data, can be stored in another memory location in the memory. At this point, methodology 1300 can end.

It is to be understood and appreciated that the computer-implemented programs and software (e.g., matrix generating program) can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone, watch), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, can refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g. compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits or symbols within a memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates error correction of data, comprising:
   a memory configured to store encoded data, parity data associated with the encoded data, and matrix data associated with a matrix, wherein the matrix comprises a first matrix used to encode data for storage in the memory to yield the encoded data and a second matrix used to generate the parity data based in part on a low-density parity-check code;
   an accumulative repeat encoder component configured to generate the parity data associated with the encoded data based in part on the matrix;
   a computation component configured to decode the encoded data based in part on the parity data to yield a decoded symbol sequence and to multiply the decoded symbol sequence with the matrix to yield a matrix multiplication result; and
   a decision component configured to instruct the computation component to perform a subsequent iteration of decoding on the encoded data in response to a determination that the decoded symbol sequence violates at least one parity check constraint based on the matrix multiplication result.

2. The system of claim 1, wherein the parity data is based in part on a low-density parity-check code.

3. The system of claim 1, wherein the computation component is further configured to cease performing iterations of decoding on the encoded data in response to a determination that the decoded symbol sequence satisfies the parity check constraints or in response to a predetermined maximum number of iterations being performed.

4. The system of claim 1, wherein rows of the matrix correspond to respective parity check constraints, and columns of the matrix correspond to respective symbols comprising the data.

5. The system of claim 1, further comprising a translation component configured to translate at least one of a multiplication operation or a division operation into a log domain wherein the multiplication operation is translated to an addition operation and the division operation is translated to a subtraction operation in the log domain.

6. The system of claim 1, wherein the second matrix has a transfer function of $1/(1+D)$.

7. The system of claim 1, wherein the accumulative repeat encoder comprises:
an adder component configured to sum respective matrix multiplication results of the first matrix and the data to yield a summed result; and
an integrator component configured to process the summed result based in part on a transfer function associated with the second matrix to generate the parity data.

8. The system of claim 1, further comprising a memory module including at least one of the memory, a cryptographic component, the accumulative repeat encoder component, a decoder component, an analog-to-digital converter, a digital-to-analog converter, or a storage component.

9. The system of claim 1, wherein the memory is a non-volatile memory that is at least one of flash memory, multi-bit flash memory, read only memory (ROM), programmable ROM (PROM), erasable programmable read only memory (EPROM), or electronically erasable programmable read only memory (EEPROM).

10. The system of claim 1, further comprising a host processor configured to generate at least one of a write command, a read command, or an erase command.

11. An electronic device comprising the system of claim 1, wherein the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), a Hardware Security Module (HSM), a set-top box, a secure portable token, a Universal Serial Bus (USB) token, a key token, a secure memory device, an electronic device with tamper-resistant chips, a navigation system, an electronic device associated with an industrial control system, or an embedded computer in a machine, wherein the machine comprises one of an airplane, a copier, a motor vehicle, or a microwave oven.

12. A method that facilitates error correcting data, comprising:
encoding data using a first matrix to yield encoded data and generating parity data associated with the encoded data using a second matrix based on a low-density parity-check code;
decoding the encoded data based in part on the parity data yielding a decoded symbol sequence;
multiplying the decoded symbol sequence with a matrix yielding a matrix multiplication result, wherein the matrix comprises a concatenation of the first matrix and the second matrix; and
performing a subsequent iteration of the decoding in response to determining that the decoded symbol sequence violates at least one parity check constraint based on the matrix multiplication result.

13. The method of claim 12, further comprising:
multiplying a sequence of pieces of data with the first matrix to yield a sequence of matrix multiplication results;
adding the sequence of matrix multiplication results to yield summed matrix multiplication results;
integrating the summed matrix multiplication results based in part on a transfer function associated with the second matrix;
generating the parity data based in part on the second matrix; and
outputting the summed matrix multiplication results and the parity data associated with the data as the encoded data.

14. The method of claim 13, further comprising:
converting the encoded data into at least one analog signal; and
storing the at least one analog signal in a memory.

15. The method of claim 12, further comprising:
retrieving at least one analog signal from a memory, the at least one analog signal corresponding to the encoded data; and
converting the at least one analog signal into at least one sequence associated with the encoded data.

16. The method of claim 12,
wherein the decoding comprises:
receiving one or more symbols comprising the encoded data; and
calculating a probability associated with determining respective values of the one or more symbols to yield the decoded symbol sequence,
wherein the multiplying comprises:
multiplying the decoded symbol sequence with the first matrix used to encode the data and the second matrix used to generate the parity data.

17. The method of claim 12, further comprising:
determining whether a predetermined maximum number of iterations of the decoding has been performed; and
at least one of:
performing at least one additional iteration of the decoding in response to determining that the predetermined maximum number of iterations has not been performed, or
providing as an output at least one of a decoding result associated with a current iteration of the decoding or an error message in response to determining that the predetermined maximum number of decoding iterations has been performed.

18. The method of claim 12, further comprising:
translating at least one mathematical operation associated with decoding into at least one disparate mathematical operation in a log domain, the at least one mathematical operation is at least one of a multiplication operation or a division operation and the at least one disparate mathematical operation is at least one of an addition operation or a subtraction operation.

19. A system, comprising:
means for encoding data using a first matrix to yield encoded data and generating parity data associated with the encoded data using a second matrix based on a low-density parity-check code;
means for decoding the encoded data based in part on the parity data to yield a decoded symbol sequence;
means for multiplying the decoded symbol sequence with a matrix to yield a matrix multiplication result, wherein the matrix is a concatenation of the first matrix and the second matrix; and
means for performing a subsequent decoding iteration on the encoded data in response to a determination that the decoded symbol sequence fails to satisfy at least one parity check constraint based on the matrix multiplication result.

20. The system of claim 19, further comprising:
means for converting the encoded data into at least one analog signal, the at least one analog signal corresponding to the encoded data;
means for storing the at least one analog signal;
means for retrieving the at least one analog signal; and
means for converting the at least one analog signal into at least one sequence.

* * * * *